ID012555595B2

United States Patent
Katsir et al.

(10) Patent No.: US 12,555,595 B2
(45) Date of Patent: Feb. 17, 2026

(54) CONVERTING A SEQUENCE OF SPEECH RECORDS OF A HUMAN SUBJECT INTO A SEQUENCE OF INDICATORS OF A PHYSIOLOGICAL STATE OF THE SUBJECT

(71) Applicant: Cordio Medical Ltd., Or Yehuda (IL)

(72) Inventors: Itai Katsir, Shaar Efraim (IL); Raziel Haimi-Cohen, Springfield, NJ (US); Ilan D. Shallom, Gedera (IL)

(73) Assignee: Cordio Medical Ltd., Or-Yehuda (IL)

( * ) Notice: Subject to any disclaimer, the term of this patent is extended or adjusted under 35 U.S.C. 154(b) by 233 days.

(21) Appl. No.: 18/319,518

(22) Filed: May 18, 2023

(65) Prior Publication Data
US 2024/0386906 A1 Nov. 21, 2024

(51) Int. Cl.
*G10L 25/66* (2013.01)
*G10L 25/63* (2013.01)
*G16H 50/20* (2018.01)

(52) U.S. Cl.
CPC .............. *G10L 25/66* (2013.01); *G10L 25/63* (2013.01); *G16H 50/20* (2018.01)

(58) Field of Classification Search
CPC .......... G10L 25/66; G10L 25/63; G16H 50/20
See application file for complete search history.

(56) References Cited

U.S. PATENT DOCUMENTS

| | | |
|---|---|---|
| 4,292,471 A | 9/1981 | Kuhn et al. |
| 4,838,275 A | 6/1989 | Lee |
| 5,853,005 A | 12/1998 | Scanlon |
| 5,864,810 A | 1/1999 | Digalakis et al. |
| 6,006,188 A | 12/1999 | Bogdashevsky et al. |
| 6,168,568 B1 | 1/2001 | Gavriely |
| 6,241,683 B1 | 6/2001 | Macklem et al. |
| 6,289,313 B1 | 9/2001 | Heinonen et al. |
| 6,389,393 B1 | 5/2002 | Gong |

(Continued)

FOREIGN PATENT DOCUMENTS

| | | |
|---|---|---|
| CN | 102125427 A | 7/2011 |
| CN | 102176863 A | 9/2011 |

(Continued)

OTHER PUBLICATIONS

Eden et al., "Measuring phonological distance between languages", Doctor Thesis, UCL Department of Linguistics, pp. 1-254, year 2018.

(Continued)

*Primary Examiner* — Ibrahim Siddo
(74) *Attorney, Agent, or Firm* — Meitar Patents Ltd.; Daniel Kligler

(57) ABSTRACT

A system includes a memory and a processor. The memory is configured to store a machine learning (ML) model trained using a plurality of sequences of speech records of humans having each at least one of a respective known physiological state, psychological state and emotional state. The processor is configured to (i) receive a sequence of speech records of a human subject, (ii) apply the trained ML model to infer from the sequence of speech records of the human subject a sequence of one or more indicators indicative of at least one: a physiological state, a psychological state, and an emotional state of the human subject, and (iii) make the indicators available.

36 Claims, 6 Drawing Sheets

(56) References Cited

U.S. PATENT DOCUMENTS

| | | |
|---|---|---|
| 6,396,416 B1 | 5/2002 | Kuusela et al. |
| 6,527,729 B1 | 3/2003 | Turcott |
| 6,600,949 B1 | 7/2003 | Turcott |
| 7,092,874 B2 | 8/2006 | Clavbo |
| 7,225,013 B2 | 5/2007 | Geva et al. |
| 7,226,422 B2 | 6/2007 | Hatlestsad et al. |
| 7,267,652 B2 | 9/2007 | Coyle et al. |
| 7,283,962 B2 | 10/2007 | Meyerhoif et al. |
| 7,363,226 B2 | 4/2008 | Shiomi et al. |
| 7,398,213 B1 | 7/2008 | Levanon et al. |
| 7,457,753 B2 | 11/2008 | Moran et al. |
| 7,529,670 B1 | 5/2009 | Michaelis |
| 7,762,264 B1 | 7/2010 | Raming et al. |
| 8,478,596 B2 | 7/2013 | Schultz |
| 8,591,430 B2 | 11/2013 | Amurthur et al. |
| 8,684,900 B2 | 4/2014 | Tran |
| 8,689,606 B2 | 4/2014 | Schellekens et al. |
| 8,784,311 B2 | 7/2014 | Shrivastav et al. |
| 8,903,725 B2 | 12/2014 | Pilz |
| 9,070,357 B1 | 6/2015 | Kennedy et al. |
| 9,138,167 B1 | 9/2015 | Leydon |
| 9,153,231 B1 | 10/2015 | Salvador et al. |
| 9,159,329 B1 | 10/2015 | Agiomyrgiannakis et al. |
| 9,445,763 B2 | 9/2016 | Davis et al. |
| 9,492,096 B2 | 11/2016 | Brockway et al. |
| 9,579,056 B2 | 2/2017 | Rosenbek et al. |
| 9,685,174 B2 | 6/2017 | Karam et al. |
| 9,922,641 B1 | 3/2018 | Chun |
| 10,311,980 B2 | 6/2019 | Kim et al. |
| 10,796,205 B2 | 10/2020 | Shi et al. |
| 10,796,805 B2 | 10/2020 | Lotan et al. |
| 10,847,177 B2 | 11/2020 | Shallom |
| 10,896,765 B2 | 1/2021 | Kim et al. |
| 10,991,384 B2 | 4/2021 | Eyben et al. |
| 11,011,188 B2 | 5/2021 | Shallom |
| 11,024,327 B2 | 6/2021 | Shallom |
| 11,417,342 B2 | 8/2022 | Shallom |
| 11,484,211 B2 | 11/2022 | Shallom |
| 11,538,490 B2 | 12/2022 | Shallom |
| 11,610,600 B2 | 3/2023 | Shallom |
| 12,046,238 B2 | 7/2024 | Khaleghi |
| 2002/0059029 A1 | 5/2002 | Todder et al. |
| 2003/0115054 A1 | 6/2003 | Iso-Sipila |
| 2003/0220790 A1 | 11/2003 | Kepuska |
| 2004/0097822 A1 | 5/2004 | Muz et al. |
| 2005/0038635 A1 | 2/2005 | Klefenz et al. |
| 2005/0060153 A1 | 3/2005 | Gable et al. |
| 2006/0058697 A1 | 3/2006 | Mochizuki et al. |
| 2006/0116878 A1 | 6/2006 | Nagamine |
| 2006/0167385 A1 | 7/2006 | Guion |
| 2006/0293609 A1 | 12/2006 | Stahmann et al. |
| 2007/0005357 A1 | 1/2007 | Moran et al. |
| 2007/0100623 A1 | 5/2007 | Hentschel et al. |
| 2007/0225975 A1 | 9/2007 | Imoto |
| 2007/0288183 A1 | 12/2007 | Bulkes et al. |
| 2008/0013747 A1 | 1/2008 | Tran |
| 2008/0275349 A1 | 11/2008 | Halperin et al. |
| 2009/0036777 A1 | 2/2009 | Zhang et al. |
| 2009/0043586 A1 | 2/2009 | MacAuslan |
| 2009/0099848 A1 | 4/2009 | Lerner et al. |
| 2009/0227888 A1 | 9/2009 | Salmi et al. |
| 2009/0326937 A1 | 12/2009 | Chitsaz et al. |
| 2010/0201807 A1 | 8/2010 | Mcpherson |
| 2011/0021940 A1 | 1/2011 | Chu et al. |
| 2011/0092779 A1 | 4/2011 | Chang et al. |
| 2011/0125044 A1 | 5/2011 | Rhee |
| 2011/0184250 A1 | 7/2011 | Schmidt et al. |
| 2011/0314897 A1 | 12/2011 | Schellekens et al. |
| 2012/0041279 A1 | 2/2012 | Freeman et al. |
| 2012/0116186 A1 | 5/2012 | Shrivastav et al. |
| 2012/0220899 A1 | 8/2012 | Oh et al. |
| 2012/0265024 A1 | 10/2012 | Shrivastav et al. |
| 2012/0283598 A1 | 11/2012 | Horii et al. |
| 2013/0018274 A1 | 1/2013 | O'Neill |
| 2013/0158434 A1 | 6/2013 | Shen et al. |
| 2013/0166279 A1 | 6/2013 | Dines et al. |
| 2013/0218582 A1 | 8/2013 | Lalonde |
| 2014/0005564 A1 | 1/2014 | Ivanovic et al. |
| 2014/0073993 A1 | 3/2014 | Poellabauer et al. |
| 2014/0153794 A1 | 6/2014 | Varaklis et al. |
| 2014/0249424 A1 | 9/2014 | Fan et al. |
| 2014/0294188 A1 | 10/2014 | Rini et al. |
| 2014/0302472 A1 | 10/2014 | Fletcher |
| 2014/0314212 A1 | 10/2014 | Bentley et al. |
| 2015/0073306 A1 | 3/2015 | Abeyratne et al. |
| 2015/0126888 A1 | 5/2015 | Patel et al. |
| 2015/0127350 A1 | 5/2015 | Agiomyrgiannakis |
| 2015/0216448 A1 | 8/2015 | Lotan et al. |
| 2015/0265205 A1 | 9/2015 | Rosenbek et al. |
| 2016/0015289 A1 | 1/2016 | Simon et al. |
| 2016/0045161 A1 | 2/2016 | Alshaer et al. |
| 2016/0081611 A1 | 3/2016 | Hampton et al. |
| 2016/0095545 A1 | 4/2016 | Levanon |
| 2016/0113618 A1 | 4/2016 | Su et al. |
| 2016/0249842 A1 | 9/2016 | Ohana Lubelchick |
| 2016/0302003 A1 | 10/2016 | Rahman et al. |
| 2017/0069312 A1 | 3/2017 | Sundararajan et al. |
| 2017/0084295 A1 | 3/2017 | Tsiartas et al. |
| 2017/0262606 A1 | 9/2017 | Abdullah et al. |
| 2017/0280239 A1 | 9/2017 | Sekiya et al. |
| 2017/0325779 A1 | 11/2017 | Spina et al. |
| 2017/0354363 A1 | 12/2017 | Quatieri et al. |
| 2018/0004913 A1 | 1/2018 | Ghasemzadeh et al. |
| 2018/0108440 A1 | 4/2018 | Stevens et al. |
| 2018/0125444 A1 | 5/2018 | Kahlman et al. |
| 2018/0214061 A1 | 8/2018 | Knoth et al. |
| 2018/0296092 A1 | 10/2018 | Hassan et al. |
| 2019/0080803 A1 | 3/2019 | Lotan et al. |
| 2019/0130910 A1 | 5/2019 | Kariya et al. |
| 2019/0221317 A1 | 7/2019 | Kempanna et al. |
| 2019/0311815 A1 | 10/2019 | Kim et al. |
| 2019/0385711 A1* | 12/2019 | Shriberg ............... G16H 15/00 |
| 2020/0077940 A1 | 3/2020 | Srivastava et al. |
| 2020/0098384 A1 | 3/2020 | Nematihosseinabadi et al. |
| 2020/0118583 A1 | 4/2020 | Shallom |
| 2020/0152226 A1 | 5/2020 | Anushiravani et al. |
| 2020/0168230 A1 | 5/2020 | Roh et al. |
| 2021/0065676 A1 | 3/2021 | Abrami et al. |
| 2021/0110894 A1 | 4/2021 | Shriberg et al. |
| 2021/0193169 A1 | 6/2021 | Faizakof et al. |
| 2021/0256992 A1 | 8/2021 | Shallom |
| 2022/0130415 A1 | 4/2022 | Garrison et al. |
| 2022/0165295 A1 | 5/2022 | Shallom |
| 2022/0257466 A1* | 8/2022 | Nitzan ................. A61H 1/0266 |
| 2022/0328064 A1 | 10/2022 | Shriberg et al. |
| 2022/0409063 A1 | 12/2022 | Shallom |
| 2022/0415308 A1 | 12/2022 | Berisha et al. |
| 2023/0072242 A1* | 3/2023 | Kim ..................... G16H 50/20 |
| 2023/0080870 A1 | 3/2023 | Shallom |
| 2023/0190177 A1 | 6/2023 | Shor et al. |
| 2023/0352013 A1 | 11/2023 | Khaleghi |

FOREIGN PATENT DOCUMENTS

| | | |
|---|---|---|
| CN | 102423262 A | 4/2012 |
| CN | 202261466 U | 5/2012 |
| CN | 102497472 A | 6/2012 |
| CN | 107622797 A | 1/2018 |
| CN | 108135485 A | 6/2018 |
| CN | 111837183 A | 10/2020 |
| DE | 102015218948 A1 | 3/2017 |
| EP | 1091689 A1 | 4/2001 |
| EP | 1855594 A1 | 11/2007 |
| EP | 2124223 A1 | 11/2009 |
| EP | 2438863 A1 | 4/2012 |
| EP | 3365057 A1 | 8/2018 |
| FR | 2672793 A1 | 8/1992 |
| GB | 1219618 A | 1/1971 |
| GB | 2493458 A | 2/2013 |
| JP | 04082538 A | 3/1992 |
| JP | 09173320 A | 7/1997 |
| JP | 2003044078 A | 2/2003 |
| JP | 2004302786 A | 10/2004 |
| JP | 2006230548 A | 9/2006 |

(56) References Cited

FOREIGN PATENT DOCUMENTS

| | | | |
|---|---|---|---|
| JP | 2010139494 A | 6/2010 |
| JP | 2016006504 A | 1/2016 |
| JP | 2017191166 A | 10/2017 |
| JP | 6263308 B1 | 1/2018 |
| SE | 508439 C2 | 10/1998 |
| WO | 03068062 A1 | 8/2003 |
| WO | 2005074799 A1 | 8/2005 |
| WO | 2006033044 A3 | 3/2006 |
| WO | 2006079062 A1 | 7/2006 |
| WO | 2010004025 A1 | 1/2010 |
| WO | 2010015865 A1 | 2/2010 |
| WO | 2010123483 A2 | 10/2010 |
| WO | 2012038903 A2 | 3/2012 |
| WO | 2012104743 A2 | 8/2012 |
| WO | 2013043847 A1 | 3/2013 |
| WO | 2013170131 A1 | 11/2013 |
| WO | 2014037843 A1 | 3/2014 |
| WO | 2014045257 A1 | 3/2014 |
| WO | 2014188408 A1 | 11/2014 |
| WO | 2016028495 A1 | 2/2016 |
| WO | 2017060828 A1 | 4/2017 |
| WO | 2017068582 A1 | 7/2017 |
| WO | 2017147221 A1 | 8/2017 |
| WO | 2018021920 A1 | 2/2018 |
| WO | 2019089830 A1 | 5/2019 |
| WO | 2019210261 A1 | 10/2019 |

OTHER PUBLICATIONS

Falkhausen et al., "Calculation of Distance Measures Between Hidden Markov Models", 4th European Conference on Speech Communication and Technology, pp. 1487-1490, Sep. 18-21, 1995.

Kempton et al., "Cross-language phone recognition when the target language phoneme inventory is not known", 12th Annual Conference of the International Speech Communication Association, pp. 3165-3168, Aug. 27-31, 2011.

Kienappel et al., "Cross-Language Transfer of Multilingual Phoneme Models", ASR2000-Automatic Speech Recognition Challenges for the New Millennium, pp. 1-5, Sep. 18-20, 2000.

Gupta et al., "Characterizing Exhaled Airflow from Breathing and Talking," Indoor Air, vol. 20, pp. 31-39, year 2010.

Mirza et al., "Analytical Modeling and Simulation of a CMOS-MEMS Cantilever Based CO2 Sensor for Medical Applications, Proceedings IEEE Regional Symposium on Micro and Nanoelectronics," pp. 70-73, Sep. 27, 2013.

Bhagya et al., "Speed of Sound-Based Capnographic Sensor with Second-Generation CNN for Automated Classification of Cardiorespiratory Abnormalities," IEEE Sensors Journal, vol. 19, issue 19, pp. 8887-8894, Oct. 1, 2019.

Kohler, "Multi-Lingual Phoneme Recognition Exploiting Acoustic-Phonetic Similarities of Sounds", 4th International Conference on Spoken Language Processing (ICSLP 96), pp. 1-4, Oct. 3-6, 1996.

Pitts et al., "Using Voluntary Cough to Detect Penetration and Aspiration During Oropharyngeal Swallowing in Patients With Parkinson Disease", Chest, vol. 138, issue 6, pp. 1426-1431, Dec. 2010.

Sooful et al., "An acoustic distance measure for automatic cross-language phoneme mapping", PRASA proceedings, pp. 1-4, year 2001.

Sooful et al., "Comparison of acoustic distance measures for automatic cross-language phoneme mapping", 7th International Conference on Spoken Language Processing, pp. 1-4, Sep. 16-20, 2002.

Sterling et al., "Automated Cough Assessment on a Mobile Platform", Journal of Medical Engineering, pp. 1-10, year 2014.

Vaswani et al., "Attention is all you need", 31st Conference on Neural Information Processing systems, pp. 1-11, year 2017.

Zeng et al., "A new distance measure for hidden Markov models", Expert Systems with Applications, vol. 37, pp. 1550-1555, year 2010.

Rabiner et al., "Fundamentals of Speech Recognition", Prentice Hall, chapters 7-8, pp. 390-481, year 1993.

Wikipedia, "Breathing," pp. 1-13, last edited Oct. 17, 2021, as downloaded from https://en.wikipedia.org/wiki/Breathing.

"Sound Speed in Gases," Sound and Hearing, HyperPhysics, Department of Physics and Astronomy, Georgia State University, USA, pp. 1-3, year 2017, as downloaded from http://hyperphysics.phy-astr.gsu.edu/hbase/Sound/souspe3.html.

"Echo Devices," Amazon.com, Inc, Interest-Based Ads, pp. 1-6, year 2021, as downloaded from https://www.amazon.com/echo-devices/s?k=echo+devices.

"The Best Google Home Speakers in 2021," Tom's Guide, Future US Inc., pp. 1-21, year 2021, as downloaded from https://www.tomsguide.com/best-picks/best-google-home-speakers.

West et al., "Measurements of Pulmonary Gas Exchange Efficiency using Expired Gas and Oximetry: Results in Normal Subjects," American Journal of Physiology—Lung Cellular and Molecular Physiology, vol. 314, No. 4, pp. L686-L689, year 2018.

West et al., "A New Method for Noninvasive Measurement of Pulmonary Gas Exchange Using Expired Gas," Respiratory Physiology & Neurobiology, vol. 247, pp. 112-115, year 2018.

Huang et al., "An Accurate Air Temperature Measurement System Based on an Envelope Pulsed Ultrasonic Time-of-Flight Technique," Review of Scientific Instruments, vol. 78, pp. 115102-1-115102-9, year 2007.

Jedrusyna, "An Ultrasonic Air Temperature Meter", Book "Recent Advances in Mechatronics", Springer, Berlin, Heidelberg, pp. 85-89, year 2010.

Cramer, "The Variation of the Specific Heat Ratio and the Speed of Sound in Air with Temperature, Pressure, Humidity, and CO2 Concentration," Journal of the Acoustical Society of America, vol. 93, No. 5, pp. 2510-2516, May 1993.

Rao et al., "Acoustic Methods for Pulmonary Diagnosis," HHS Public Access, Author manuscript, pp. 1-39, year 2020 (final version published in IEEE Reviews in Biomedical Engineering, vol. 12, pp. 221-239, year 2019).

Cohen, "Signal processing methods for upper airway and pulmonary dysfunction diagnosis," IEEE Engineering in Medicine and Biology Magazine, vol. 9, No. 1, pp. 72-75, Mar. 1, 1990.

Ney, "The Use of a One-Stage Dynamic Programming Algorithm for Connected Word Recognition," IEEE Transactions on Acoustics, Speech, and Signal Processing, vol. ASSP-32, No. 2, pp. 263-271, Apr. 1984.

Haimi-Cohen et al., U.S. Appl. No. 18/105,847, filed Feb. 5, 2023.

Sakran et al., "A Review: Automatic Speech Segmentation", International Journal of Computer Science and Mobile Computing (IJCSMC), vol. 6, issue 4, pp. 308-315, Apr. 2017.

Nicora et al., "Evaluating pointwise reliability of machine learning prediction", Journal of Biomedical Informatics, vol. 127, pp. 1-15, Mar. 2022.

JP Application # 2021-517971 Office Action dated May 16, 2023.
EP Application # 21209891.7 Office Action dated May 19, 2023.
Indian Application # 202247066856 Office Action dated Mar. 29, 2023.
EP Application # 19201720.0 Office Action dated Mar. 30, 2023.
EP Application # 20158058.6 Summons to Oral Proceedings dated Apr. 19, 2023.
Haimi-Cohen et al., U.S. Appl. No. 18/105,848, filed Feb. 5, 2023.
Haimi-Cohen et al., U.S. Appl. No. 18/328,738, filed Jun. 4, 2023.
Haimi-Cohen et al., U.S. Appl. No. 18/328,739, filed Jun. 4, 2023.

Rabiner, L., "A tutorial on hidden Markov models and selected applications in speech recognition," Proceedings of the IEEE, vol. 77, issue 2, pp. 257-286, Feb. 1989.

Rabiner et al., "Fundamentals of Speech Recognition", Prentice Hall, pp. 1-18 (related section 6.4.3.), year 1993.

Sakoe et al., "Dynamic Programming Algorithm Optimization for Spoken Word Recognition", IEEE Transactions on Acoustics, Speech and Signal Processing, vol. ASSP-26, No. 1, pp. 43-49, Feb. 1978.

Lee et al., "Consistency of acoustic and aerodynamic measures of voice production over 28 days under various testing conditions", Journal of Voice, vol. 13, issue 4, pp. 477-483, Dec. 1, 1999.

(56) References Cited

OTHER PUBLICATIONS

Walia et al., "Level of Asthma: A Numerical Approach based on Voice Profiling", IJEDR(International Journal of Engineering Development and Research),vol. 4, Issue 4, pp. 717-722, year 2016.
Mulligan et al., "Detecting regional lung properties using audio transfer functions of the respiratory system", 31st Annual International Conference of the IEEE EMBS, pp. 5697-5700, Sep. 2-6, 2009.
Christina et al., "HMM-based speech recognition system for the dysarthric speech evaluation of articulatory subsystem", International Conference on Recent Trends in Information Technology, pp. 54-59, Apr. 1, 2012.
Wang et al., "Vocal folds disorder detection using pattern recognition methods", 29th Annual International Conference of the IEEE Engineering in Medicine and Biology Society, pp. 3253-3256, Aug. 22-26, 2007.
Masada et al., "Feature Extraction by ICA and Clustering for Lung Sound Classification", IPSJ Symposium Series, vol. 2007, pp. 1-9, year 2007.
De La Torre et al., "Discriminative feature weighting for HMM-based continuous speech recognizers", Speech Communication, vol. 38, pp. 267-286, year 2001.
Viswanathan et al., "Complexity Measures of Voice Recordings as a Discriminative Tool for Parkinson's Disease", MDPI Journal Biosensors 2020, vol. 10, No. 1, pp. 1-16, Dec. 20, 2019.
Williamson et al., "Segment-dependent dynamics in predicting Parkinson's disease", ISCA Conference Interspeech 2015, pp. 518-522, Dresden, Germany, Sep. 6-10, 2015.
Valente et al., "Maximum Entropy Discrimination (MED) Feature subset Selection for Speech Recognition", IEEE Workshop on Automatic Speech Recognition and Understanding (ASRU), ResearchGate publication, pp. 327-332, Nov. 30-Dec. 4, 2003.
Ramirez et al.,"Voice activity detection. Fundamentals and speech recognition system robustness", Robust Speech Recognition and Understanding, I-Tech, Vienna, Austria, pp. 1-24, Jun. 2007.
Bachu et al., "Separation of Voiced and Unvoiced Speech Signals using Energy and Zero Crossing Rate", ASEE Regional Conference, pp. 1-7, year 2008.
CN Application # 2020800180012 Office Action dated Jan. 30, 2024.
IN Application # 202347030550 Office Action dated Dec. 13, 2023.
CN Application # 2019800670875 Office Action dated Dec. 20, 2023.
JP Application # 2021549583 Office Action dated Dec. 25, 2023.
JP Application # 2021551893 Office Action dated Dec. 25, 2023.
CN Application # 202080017839X Office Action dated Jan. 27, 2024.
JP Application # 2022548568 Office Action dated Oct. 29, 2024.
U.S. Appl. No. 17/531,828 Office Action dated Jan. 15, 2025.
U.S. Appl. No. 18/105,848 Office Action dated Jan. 21, 2025.
Hickey., "App lets you monitor lung health using only a smartphone", pp. 1-5, Sep. 18, 2012.
Gandler et al., "Mobile FEV: Evaluation of iPhone Spirometer", pp. 1-1, Feb. 14, 2013.
Abushakra et al., "Lung capacity estimation through acoustic signal of breath", 13th IEEE International Conference on BioInformatics and BioEngineering, pp. 386-391, Nov. 11-Nov. 13, 2012.
G.P. Imports, Inc., "Spirometer Pro", pp. 1-3, Jan. 8, 2010.
Murton et al., "Acoustic speech analysis of patients with decompensated heart failure: A pilot study", The Journal of the Acoustical Society of America, vol. 142, Issue 4, pp. 1-28, Oct. 24, 2017.
Gillespie et al., "The Effects of Hyper- and Hypocapnia on Phonatory Laryngeal Airway Resistance in Women", Research Article, Journal of Speech, Language, and 638 Hearing Research, vol. 58, pp. 638-652, Jun. 2015.
Wang et al., "Accuracy of perceptual and acoustic methods for the detection of inspiratory loci in spontaneous speech", Behavior Research Methods, vol. 44, Issue 4, pp. 1121-1128, Dec. 2012.
International Application # PCT/IB2024/054360 Search Report dated Jun. 28, 2024.
JP Application # 2022576351 Office Action dated Jul. 2, 2024.
U.S. Appl. No. 17/902,836 Office Action Jul. 8, 2024.
International Application # PCT/IB2024/054359 Search Report dated Jul. 9, 2024.
AU Application # 2021384028 Office Action Aug. 15, 2024.
EP Application # 24181539.8 Search Report dated Sep. 4, 2024.
International Application # PCT/IB2024/050483 Search Report dated May 7, 2024.
EP Application # 21832054.7 Search Report dated Mar. 11, 2024.
CN Application # 202180045274.0 Office Action dated Feb. 28, 2025.
U.S. Appl. No. 18/328,738 Office Action dated Apr. 11, 2025.
U.S. Appl. No. 18/328,739 Office Action dated Apr. 25, 2025.
U.S. Appl. No. 18/105,847 Office Action dated May 6, 2025.
CN Application # 202180017631.2 Office Action dated Mar. 31, 2025.
Voleti et al., "A Review of Automated Speech and Language Features for Assessment of Cognitive and Thought Disorders," IEEE Journal of Selected Topics in Signal Processing, vol. 14, No. 2, pp. 282-298, Feb. 2020.
Larson et al., "SpiroSmart: using a microphone to measure lung function on a mobile phone", Proceedings of the 2012 ACM Conference on Ubiquitous Computing (UbiComp '12), pp. 280-289, Sep. 5-8, 2012.
Abushakra et al., "An Automated Approach Towards Estimating Lung Capacity from Respiration Sounds", IEEE Healthcare Innovations Conference (HIC'12), pp. 1-5, Jan. 2012.
Williammson et al., "Vocal and Facial Biomarkers of Depression Based on Motor Incoordination and Timing", 4th International Audio/Visual Emotion Challenge and Workshop: Depression Challenge, Orlando, Florida, USA , pp. 1-8, Nov. 7, 2014.
Ciccarelli et al., "Neurophysiological Vocal Source Modeling for Biomarkers of Disease", INTERSPEECH 2016: Understanding Speech Processing in Humans and Machines, Technical Program, San Francisco, USA, pp. 1-7, Sep. 8-12, 2016.
Helfer et al., "Classification of depression state based on articulatory precision", Proceedings of the 14th Annual Conference of the International Speech Communication Association (INTERSPEECH), pp. 2172-2176, year 2013.
Horwitz., "Vocal Modulation Features in the Prediction of Major Depressive Disorder Severity", Master Thesis, Massachusetts Institute of Technology, pp. 1-115, Sep. 2014.
Hillel., "Using phonation time to estimate vital capacity in amyotrophic lateral sclerosis", Arch Phys Med Rehabil, vol. 70, pp. 618-620, Aug. 1989.
Yanagihara., "Phonation and Respiration", Folia Phoniat, vol. 18, pp. 323-340, year 1966.
Dewar et al., "Chronic obstructive pulmonary disease: diagnostic considerations.", American Academy of Family Physicians, vol. 73, pp. 669-676, Feb. 2006.
Solomon et al., "Respiratory and laryngeal contributions to maximum phonation duration", Journal of voice, vol. 14, No. 3, pp. 331-340, Sep. 2000.
Dogan et al., "Subjective and objective evaluation of voice quality in patients with asthma", Journal of voice, vol. 21, No. 2, pp. 224-230, Mar. 2007.
Orenstein et al.,"Measuring ease of breathing in young patients with cystic fibrosis", Pediatric Pulmonology, vol. 34, No. 6, pp. 473-477, Aug. 8, 2002.
Lee et al., "Speech Segment Durations Produced by Healthy and Asthmatic Subjects", Journal of Speech and Hearing Disorders, vol. 653, pp. 186-193, May 31, 1988.
Canadian Examination report, application # 3,114,864, dated Oct. 16, 2025.
Korean Office Action, application # 10-2021-7032027, dated Oct. 24, 2025.
Korean Office Action, application # 10-2021-7032025, dated Sep. 26, 2025.
Chinese Office Action, Application No. 202180076521.3, dated Dec. 23, 2025.

* cited by examiner

CONVERTING A SEQUENCE OF SPEECH RECORDS OF A HUMAN SUBJECT INTO A SEQUENCE OF INDICATORS OF A PHYSIOLOGICAL STATE OF THE SUBJECT

FIELD OF THE INVENTION

The present invention is related to the field of speech-signal processing, particularly for diagnostic purposes.

BACKGROUND

U.S. Pat. Nos. 11,011,188 and 11,024,327, whose respective disclosures are incorporated herein by reference, describe a system for evaluating the state of a subject with respect to a physiological condition by analyzing a test utterance of the subject. For example, by analyzing the test utterance, the system may identify an onset of, or a deterioration with respect to, a physiological condition such as congestive heart failure (CHF), coronary heart disease, atrial fibrillation or any other type of arrhythmia, chronic obstructive pulmonary disease (COPD), asthma, interstitial lung disease, pulmonary edema, pleural effusion, Parkinson's disease, mild cognitive impairment, or depression. In response to the evaluation, the system may communicate an output such as an alert to the subject, to the subject's physician, and/or to a monitoring service.

Sequence-to-sequence conversion was proposed in various fields including machine translation, natural language processing, speech processing, image analysis and more. The goal of the method is to correctly convert a finite sequence in one domain to a finite sequence in another domain. The input and output sequences are not necessarily of the same length. For example, in machine translation, the input is a sequence of words in the source language and the output is a sequence of words in the destination language.

If the input sequence contains segments of recorded speech, sequence-to-sequence conversion typically includes a preparatory step of speech embedding, which is typically the embedding of a segment of recorded speech into an abstract vector space of a fixed size. Embedding was proposed for applications such as text-independent speaker verification. Typically, the embedding is done by first extracting a variable length sequence of feature vectors from the speech segment, where each feature vector represents the properties of the speech in a short time interval, and then processing the feature vectors sequence using, for example, neural networks (NNs), to obtain the embedding vector. The embedding into a fixed-dimension vector represents the information needed about the data set for a specific task, such as analysis, classification, or reconstruction. The embedding vectors are usually abstract and do not lend themselves to simple interpretations. However, similar data sets are embedded into vectors which are close to each other, where "similar" and "close to each other", have a task-specific definition.

De-embedding is the reconstruction of a data set in the data domain from an embedding vector. For speech this is the reconstruction of speech, or of a sequence of feature vectors, from the embedding vector. Typically, this is done by an NN as well.

SUMMARY OF THE INVENTION

Embodiments of the present invention that are described hereinafter provide a system including a memory and a processor. The memory is configured to store a machine learning (ML) model trained using a plurality of sequences of speech records of humans having each at least one of a respective known physiological state, psychological state and emotional state. The processor is configured to (i) receive a sequence of speech records of a human subject, (ii) apply the trained ML model to infer from the sequence of speech records of the human subject a sequence of one or more indicators indicative of at least one of a physiological state, a psychological state, and an emotional state of the human subject, and (iii) make the indicators available.

In some embodiments, the sequence of speech records is a sequence of speech utterances associated with respective recording times, and the recording times are also inputs to the system.

In some embodiments, the processor is configured to apply the ML model by representing the sequence of speech records by a sequence of embedding vectors and applying the model to the embedding vectors.

In an embodiment, each embedding vector represents a respective subset of the speech records, independently of other embedding vectors.

In another embodiment, the processor is further configured to aggregate portion of the embedding vectors into a single aggregated embedding vector and applying the model to a set of the embedding vectors including the aggregated embedding vector.

In some embodiments, at least some of the indicators include at least one of a label selected from a set of labels associated with predefined set of indicators and an estimated level of confidence in the indication.

In some embodiments, the processor is configured to make the indicators available by at least one of sending the indicators over a network to a user's device, providing an interface that allows the user to access them, sending an alert message when the output sequence of indicators fits a certain pattern, and presenting the indicators graphically.

In an embodiment, the known physiological, psychological or emotional state is a medical condition and the indicators are clinical indicators.

In other embodiments, the clinical indicators include at least one medical condition selected from a list of medical conditions including cardio-vascular disease, pulmonary disease, respiratory disease, neurological disease, psychological disease, congestive heart failure, coronary heart disease, heart arrhythmia, chronic obstructive pulmonary disease (COPD), interstitial lung disease, asthma, Hypocarbia, Hypercarbia, altitude sickness, Parkinson disease, Alzheimer disease, bipolar disorder mild cognitive impairment and depression.

In some embodiments, the clinical indicators are indicative of the presence of excess fluid in the chest.

In some embodiments, the indicators provide an estimate of time left until the physiological state, psychological or emotional state reaches a certain stage.

In some embodiments, one or more of the indicators include estimates of measurable parameters of the human subject that are indicative of the at least one of the physiological state, the psychological state, and the emotional state of the human subject.

In an embodiment, the processor is configured to apply the ML model to infer an indicator that is indicative of whether the human subject is stable or unstable with respect to the known physiological state, psychological state and emotional state.

In an embodiment, the trained ML model includes a trained neural network (NN) model.

In another embodiment, the trained NN algorithm includes a Transformer model including an Attention model.

In yet another embodiment, the trained NN algorithm includes a recursive neural network (RNN) model that adjusts the weights of the RNN during inference.

In some embodiments, the processor is configured to receive a sequence of speech records and apply the trained ML model to the sequence of the speech records by grouping the sequence of the speech records into a sequence of sessions of the speech records and applying the ML model to the sequence of sessions of the speech records.

There is additionally provided, in accordance with another embodiment of the invention, a system including a memory and a processor. The memory is configured to store a machine learning (ML) model The processor is configured to (i) receive a plurality of sequences of speech records of humans having each at least one of a respective known physiological state, psychological state and emotional state, and (ii) using the plurality of sequences of speech records, train the ML model to infer, from the sequence of speech records of a human subject, a sequence of one or more indicators of at least one of a physiological state, a psychological state, and an emotional state of the human subject.

There is further provided, in accordance with yet another embodiment of the invention, a method including storing a machine learning (ML) model trained using a plurality of sequences of speech records of humans having each at least one of a respective known physiological state, psychological state and emotional state. A sequence is received of speech records of a human subject. Tis applied he trained ML model to infer from the sequence of speech records of the human subject a sequence of one or more indicators indicative of at least one of a physiological state, a psychological state, and an emotional state of the human subject. The indicators are made available.

The present invention will be more fully understood from the following detailed description of embodiments thereof, taken together with the drawings, in which:

DETAILED DESCRIPTION OF EMBODIMENTS

Overview

Figure 1:
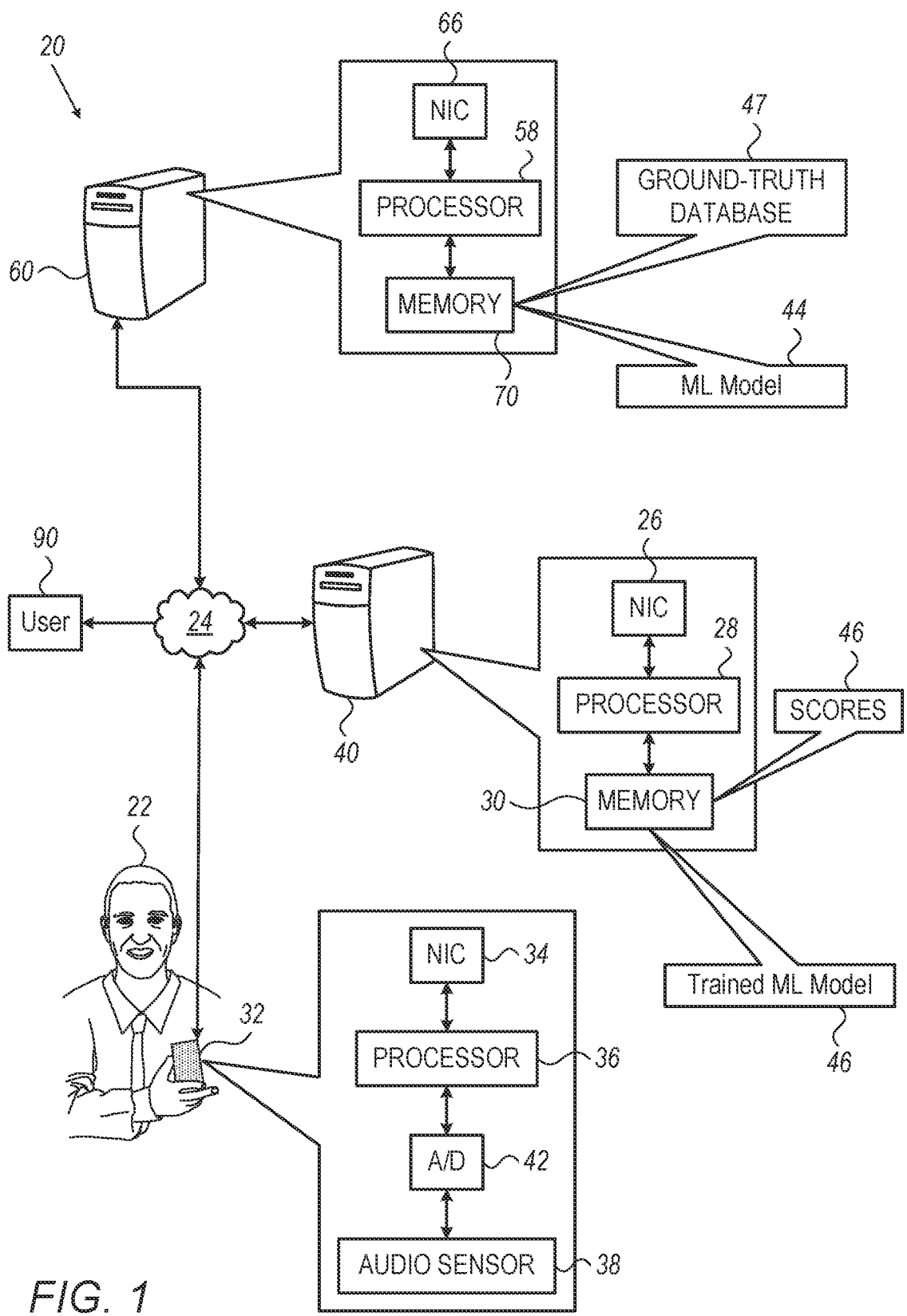
FIG. 1 is a schematic illustration of a system for evaluating a physiological and/or psychological and/or emotional state of a human subject, in accordance with some embodiments of the present invention.

Embodiments of the present invention that are described hereinafter provide sequence-to-sequence conversion machine learning (ML) based techniques for converting a sequence of speech sessions of a human subject, each comprising one or more speech records, into a sequence of indicators which depict a patient's condition, over time, with respect to a human subject's particular physiological and/or psychological and/or emotional state.

The disclosed techniques may be used for medical applications, such as to monitor the status of a patient, at a given time, with respect to a particular disease, disorder, or medical condition. The techniques can provide, for example, timely alerts of increased risk of patient deterioration, as discussed below. The disclosed techniques may be used for non-medical applications, such to monitor fatigue or stress of a person performing critical work. The techniques can provide, for example, timely alert of a pause in work that a worker requires (e.g., initiated rest).

Generally, each speech record is associated with some metadata, which may be represented by a fixed-length vector. Typically, the metadata includes the time of the recording. In addition, the metadata may include conditions of the recording, the verbal content of the speech record, temporal demarcation of speech events (e.g., phonemes or words) inside the speech record, as well as the demarcation of aspiration pauses, vital parameters such as oxygen blood saturation level, weight, medications, etc., and general patient's information such as year of birth and gender, other known diseases, etc. Such information may be obtained by preprocessing the speech records, e.g., by applying automatic speech recognition (ASR) techniques to determine the verbal content and the demarcation of speech events, or from other sources, such as additional measurements, or medical records.

Some of the metadata is specific to the speech record, e.g., information obtained by applying ASR on the speech record. Some of the metadata is common to all speech records in the same session, for example, the recording conditions, or the patient's vital parameters, and some of it is permanent, for example, the patient's year of birth and gender.

The metadata is incorporated in the input speech records or speech sessions, as will be described in more detail later. Typically, the metadata is represented as fixed-length vectors, which are attached to the corresponding terms in the input sequence. For efficiency, metadata items that are common to several terms in the sequence may be attached to only one of those terms.

In some examples, the indicators are clinical indicators. A clinical indicator is a piece of information about the status of a patient, at a given time, with respect to a particular disease, disorder, or medical condition. Specific examples of diseases addressed by the disclosed techniques are heart failure and pulmonary edema, but the disclosed techniques apply to any medical condition which affects the patient's speech, such as disorders in the cardio-vascular system, pulmonary system, respiratory system, neurological system, as well as psychological and emotional conditions. These conditions include, for example, congestive heart failure, coronary heart disease, heart arrhythmia, chronic obstructive pulmonary disease (COPD), interstitial lung disease, asthma, hypocarbia, hypercarbia, altitude sickness, Parkinson disease, Alzheimer disease, mild cognitive impairment and depression.

Generally, a clinical indicator may be a discrete symbol which gets its value in a finite "alphabet" (a label), a continuous variable, or a set of several such variables. In some embodiments these clinical indicators are estimates of measurable quantities, for example, discrete labels such as STABLE or UNSTABLE which indicate the state of the patient, or continuous variables, such as the amount of fluid in the lungs. In such embodiments a system of the disclosed ML-based techniques can be trained and tuned to provide estimates of such parameters.

The training includes running the model with many examples where the "ground truth" (the measured value) is known, comparing the output of the system with the ground truth and adjusting the system parameters to reduce a measure of the error between the estimated values and the ground truth. During training, values of a large number of parameters (matrix coefficients, NN weights, etc.) are set. The training process uses labeled speech sessions where the labels contain, for example, verified medical information regarding the patient's state at the time the speech session was recorded. During training, the system parameters are modified in such a way as to make the output similar to the corresponding labels. The training database must be quite large and must contain labels representing the full range, for example, of the clinical values. Therefore, the database must include training material from many human subjects. However, the system can adapt to the individual patient's voice using a relatively small collection of labeled speech records of the patient's own voice. The speech records in a session may be overlapping or nested. For example, a session may contain speech records of whole sentences, speech records of individual words excised from these sentences, and speech records of phonetic units (e.g., phonemes) excised from the words.

Unlike the typical application of sequence-to-sequence technology, and of NNs in general, the actual "ground truth" in the medical monitoring field is not necessarily "true." Typically, the "ground truth" is based on a physician's examination, which is sometimes cursory, and based on a general clinical impression and auscultation, whereas, in order to get an accurate ground truth, sophisticated imaging and other, possibly invasive, tests may be required, yet for practical reasons, these tests are not routinely done. As a result, it might be best for the system, for example, to output a value between 0 and 1 which shows the deterioration level of the patient's condition, though the ground truth available for training may just be binary labels of "stable" and "deteriorating," reflecting a physician's decision as to whether or not to intervene. Even using these crude labels, different physicians might assign them differently.

The disclosure interest is in clinical indicators which cannot be directly associated with any measurable physical or physiological quantity or be interpreted as an estimate thereof. For example, the indicator may be a label indicating whether the patient is getting better or getting worse, or it can be a value between 0 to 1 which describes the risk of the patient deteriorating within a short time, with 0 indicating "no risk" and 1 indicating "needs to be hospitalized." Another clinical indicator may be an estimate of the number of days until hospitalization, assuming no change in treatment. Yet another example may be the confidence level (reliability) in the estimation of other indicators. Since knowing the reliability of an output would be useful, the disclosed techniques adapt one or more general reliability estimation techniques to the sequence-to-sequence structure in order to assess estimations reliability.

For example, in some embodiments, the clinical indicator sequence includes a parameter which indicates the confidence level in, or reliability of, other parameters included in the clinical indicator sequence. For example, the clinical indicator contains an estimate of the time to hospitalization, or of the degree of patient instability, the confidence level may be a number between 0 and 1, where 0 means "no confidence" and 1 means "full confidence." For example, a method for estimating such reliability is given by Nicora, G., Rios, M., Abu-Hanna, A., & Bellazzi, R., in a paper titled, "Evaluating pointwise reliability of machine learning prediction," in Journal of Biomedical Informatics, 127 (2022).

Alternatively, the confidence parameter may give bounds on the range of the estimated parameter. For example, for an estimate of the number of days until hospitalization, the confidence level may give a "plus/minus" number of days, which reflects, for example, an estimate of the standard deviation of the estimation error (the difference between the estimated and the true values). In some embodiments, a confidence level is given for the entire output sequence. In other embodiments, a separate confidence level is given for each clinical indicator in the sequence. The confidence level may be obtained as an additional output of the sequence-to-sequence NN, e.g., by statistically analyzing a distribution of indicators to identify outliers, or it may be derived by analyzing intermediate values in the network, e.g., cross-correlations (called "Attention weights") between NN internal representation vectors, as described below.

In the above examples, the clinical indicator conveys useful information about a patient, though this information does not lend itself to association any physical with measurable or physiological quantity. If the patient is considered as a control system comprising observable variables (measurable quantities), controllable variables (treatments, e.g., dosage of medications), and internal variables (which represent the true physiological state of the patient), then these indicators provide information about the internal variables—information which hitherto was inaccessible.

In some of the disclosed techniques, the domain of the output is created by the system itself and has no existence without it. The estimation of sequences of such indicators does not fit into the conventional sequence-to-sequence conversion scheme, where the output sequence is well understood, and a person can easily decide if the output is correct. Even an expert physician would find it difficult to estimate these indicators based on examining the patient, not to mention estimating them based solely on the patient's speech. Table 1 below is an example of the content of the clinical indicator of a single day.

TABLE 1

| Indicator Name | Indicator Type |
|---|---|
| Date of session | Year-Month-Day |
| Estimated level of a given chemical in blood | Real number |
| Confidence interval of the | Two real numbers (minimum and |

TABLE 1-continued

| Indicator Name | Indicator Type |
| --- | --- |
| chemical level estimated | maximum) of range |
| Patient state | One of these labels: STABLE, DETERIORATING, IMPROVING |
| Reliability of estimate of patient state | A real number between 0 and 1 |
| Patient level of illness | A real number between 0 and 1 |
| Expected first day in which hospitalization will be needed. A special "null" symbol indicates that hospitalization is not expected in the foreseeable future | Non-negative integer |

The output sequence of clinical indicators corresponds to regularly spaced time points in the time scale of the input speech sessions. For example, the input speech session period may correspond to 30 days, and the output sequence may consist of a clinical indicator for each day during this time period. Note that the input sequence and output sequences need not be of the same length. The patient may have skipped some recording days, but the output provides clinical indicators even for the missed days.

The disclosed techniques give the patient's status over time. This history is highly valuable for the physician in deciding about treatments. One advantage of the disclosed techniques is that history is continuously updated based on later observations.

As the human subject keeps recording speech records, the length of the sequence of speech records grows and may reach the point where the input sequence becomes so long that sequence-to-sequence computation becomes prohibitively expensive or complex. The disclosed techniques provide ways to limit the size of the input to the system by grouping sequences of speech records into sequences of speech record sessions. That way, each session contains all recordings which are captured at virtually the same time, relative to the time scale of the particular physiological (e.g., disease) and/or the psychological and/or the emotional state.

In an example of a particular disease, since a heart failure condition does not change appreciably in a 30-minute period, two sentences recorded within a 30 minute period may be included in the same session. However, because a heart failure condition may change significantly within several days, two sentences recorded three days apart may not be included in the same session.

In one example, to generate sequence input of speech sessions, each speech record, along with its metadata, is converted into a vector of a fixed size as described above. These vectors are then sequentially fed into a dedicated NN, such as a recursive NN (RNN), and the single output on the RNN for the last input vector is the embedded vector which is fed into the sequence-to-sequence conversion model. In another example, the processor uses an algorithm to concatenate all the speech segments of the session, with separating intervals of, e.g., few seconds of silence or white noise. Then the processor performs speech embedding on the resulting concatenated speech, treating it as a single interval. The advantage of using a whole session as a term in the sequence is that the input sequence of speech sessions can be much shorter than a sequence of individual speech records, which can make computation much more manageable. This, however, comes at the cost of having to train an additional NN, e.g., a dedicated RNN, in the embedder as a part of whole system training.

Even when using speech sessions instead of single speech records, as the patient continues to record sessions, the length of the session sequence grows and may reach the point where the input sequence becomes so long that sequence-to-sequence computation again becomes prohibitively expensive. This invention provides ways to aggregate the far history into a fixed-size vector which is added to the input to the system, thus limiting its size.

System Description

FIG. 1 is a schematic illustration of a system 20 for evaluating a physiological and/or psychological and/or emotional state of a human subject 22, in accordance with some embodiments of the present invention.

System 20 comprises an audio-receiving device 32, such as a mobile phone, a tablet computer, a laptop computer, a desktop computer, a voice-controlled personal assistant (such as an Amazon Echo™ or a Google Home™ device), a smart speaker device, or a dedicated medical device used by subject 22. Device 32 comprises circuitry comprising an audio sensor 38 (e.g., a microphone), which converts sound waves to analog electric signals, an analog-to-digital (A/D) converter 42, a processor 36, and a communication interface 34, such as network interface controller (NIC). Typically, device 32 further comprises a volatile and/or non-volatile memory (e.g., a solid-state drive), a screen (e.g., a touchscreen), and/or other user interface components, such as a keyboard or a speaker. In some embodiments, audio sensor 38 (and, optionally, A/D converter 42) belong to a unit that is external to device 32. For example, audio sensor 38 may belong to a headset that is connected to device 32 by a wired or wireless connection, such as a Bluetooth connection.

System 20 further comprises a server 40. Server 40 comprises circuitry comprising a processor 28, a memory 30 comprising a non-volatile memory (e.g., a hard drive or flash drive) and/or a volatile memory (e.g., random access memory (RAM)), and a communication interface 26, such as an NIC. Memory 30 is configured to store an ML model 46 that is trained using a plurality of human speech record sequences, each having at least one of a respective known physiological state, a psychological state and an emotional state.

Alternatively, trained ML model 46 may be stored in a memory belonging to device 32, and device 32 may use the trained ML model as described herein.

Server 40 may further comprise a screen, a keyboard, and/or any other suitable user interface components. Typically, server 40 is located remotely from device 32, e.g., in a control center, and server 40 and device 32 communicate with one another, via their respective communication interfaces, over a network 24, which may include a cellular network and/or the Internet. In particular, network 24 can be used to communicate the one e or more aforementioned indicators to be available to a user 90. In the context of this disclosure, making the indicators available to user 90 can be performed by at least one of the following: sending the indicators over network 24 to a user's device, providing an interface that allows the user to access them, sending an alert message when the output sequence of indicators fits a certain pattern, or presenting the indicators graphically.

System 20 is configured to perform a computer-implemented procedure for evaluating the physiological and/or psychological and/or emotional state of a human subject based on speech record sequences produced by the subject.

Typically, processor 36 of device 32 and processor 28 of server 40 cooperatively perform the receiving and processing of the speech signal. For example, as the subject speaks into device 32, the sound waves of the subject's speech may be converted to an analog signal by audio sensor 38. The analog signal may be sampled and digitized by A/D converter 42. (In general, the utterances may be sampled at any suitable rate, such as a rate of between 8 and 48 KHz.) The resulting digital speech signal may be received by processor 36. Processor 36 may then communicate the speech signal, via communication interface 34, to server 40, such that processor 28 receives the speech signal via communication interface 26. Subsequently, processor 28 may process the speech signal.

In some embodiments, device 32 comprises an analog telephone that does not comprise an A/D converter or a processor. In such embodiments, device 32 sends the analog audio signal from audio sensor 38 to server 40 over a telephone network. Typically, in the telephone network, the audio signal is digitized, communicated digitally, and then converted back to analog before reaching server 40. Accordingly, server 40 may comprise an A/D converter, which converts the incoming analog audio signal, which is received via a suitable telephone-network interface, to a digital speech signal. Processor 28 receives the digital speech signal from the A/D converter, and then processes the signal as described above. Alternatively, server 40 may receive the signal from the telephone network before the signal is converted back to analog, such that the server may not necessarily comprise an A/D converter.

In some embodiments, as described in detail below with reference to subsequent figures, processor 28 is configured to receive a sequence of speech records of human subject 22, and to apply the stored trained ML model 46 to infer, from the sequence of speech records of human subject 22, a sequence of one or more indicators indicative of at least one of the following: a physiological state, a psychological state, or an emotional state, of human subject 22.

Speech samples and/or speech models may be obtained by processor 28 or processor 36 via any suitable data-transfer interface, such as communication interface 26 or a flash-drive interface.

Subsequently to evaluating the state of the subject, processor 28 may communicate any suitable audio or visual output to at least one other device, which may belong to the subject, the subject's physician, or a monitoring center. For example, processor 28 may communicate the output to processor 36, and processor 36 may then communicate the output to the subject, e.g., by displaying a message on the screen of device 32. The output may be communicated, for example, by placing a call or sending a message (e.g., a text message). As a specific example, in response to the discriminator outputting a relatively high likelihood that the subject's state is unstable, the processor may communicate an alert indicating that the subject should take medication or visit a physician. Alternatively or additionally, another processor may use output communications from processor 28 to control a medication-administering device so as to adjust an amount of medication administered to the subject. In yet another example, a remote automatic control system is provided, which receives input from a variety of sensors and information sources, such as processor 36, and controls a medication-administering device. In some embodiments, system 20 further comprises an auxiliary server 60 comprising a processor 58, a memory 70 comprising a volatile and/or non-volatile memory, and a communication interface 66, such as an NIC. Memory 70 is configured to store a ground-truth database 47, which may contain speech samples associated with respective indicators of the physiological and/or psychological and/or emotional state in which the speech samples were produced, speech models, and/or any other relevant data.

In such embodiments, based on the data in ground-truth database 47, processor 58 trains ML model 44 to become trained ML model 46. Processor 58 then communicates the ML model to server 40 or device 32.

It is thus to be understood that the various processes described hereinbelow as being performed by "the processor" may be performed by any one of processor 36, processor 28, and processor 58, or cooperatively performed by any two, or all, of these processors.

Each of the processors described herein may be embodied as a single processor, or as a cooperatively networked or clustered set of processors. Alternatively or additionally, any one of the processors described herein may belong to a virtual machine.

For each of the processors described herein, the functionality of the processor may be implemented solely in hardware, e.g., using one or more fixed-function or general-purpose integrated circuits, application specific integrated circuits (ASICs), and/or field programmable gate arrays (FPGAs). Alternatively, this functionality may be implemented at least partly in software. For example, the processor may be embodied as a programmed processor comprising, for example, a central processing unit (CPU) and/or a graphics processing unit (GPU). Program code, including software programs and/or data, may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produces a machine or special-purpose computer, configured to perform the tasks described herein.

Each of the memories described herein is configured to store program instructions that may be loaded and executed by a processor so as to perform the functionality described herein.

Converting a Sequence of Speech Records of a Human Subject into a Sequence of Indicators A sequence-to-sequence conversion system typically comprises an encoder, which converts the input sequence into an internal representation, which is usually a collection of fixed size vectors, and a decoder which converts the internal representation into the output sequence. Generally, the encoder and decoder comprise deep NNs (DNNs) of similar type and structure. These NNs are trained together. Training is done by presenting the system with corresponding input and output sequences and adjusting the weights of the NNs to produce the correct output for any given input sequence (or as close to that as possible). This is done, for example, using the back-propagation algorithm.

Each time a new session is added, the system is supposed to run a new sequence-to-sequence conversion, compute the clinical indicators starting from day one, and take into account the full history of sessions from the beginning. As the input sequence becomes longer, the computational complexity increases, and, at the same time, the diagnostic relevance of very old clinical indicators may be small. Therefore, in some embodiments, the input to the system is limited to the sessions of the last D days (D is typically between 15 to 90 days), and the system produces clinical indicators only for the last D or less days as well. The speech input older than D days is considered "far history" and ignored. Nevertheless, the sessions of the far past do carry some useful information. Indeed, any single far history session has little relevance, but together the far history terms may convey important information about the steady-state behavior of the input.

In order not to lose that information, some embodiments aggregate the "far history" information and feed it back into the encoder as additional information. This may be done using an additional NN which aggregates the far history into a fixed size vector which is fed into the encoder as a "term 0". "Term 0" precedes all other terms in the input sequence and represents the totality of the history before term 1. Typically, the far past aggregation is implemented as an RNN, denoted the aggregation RNN, where each input causes a modification in some of the weights and parameters of the network. In each conversion computation the algorithm uses the "term 0" vector computed in the previous conversion computation, and the aggregation RNN computes a new "term 0", which is stored for use in the next conversion computation. The modifiable weights and parameters of the aggregation RNN network carry the memory of the far history and are therefore saved for use in the next sequence-to-sequence computation.

Figure 2:
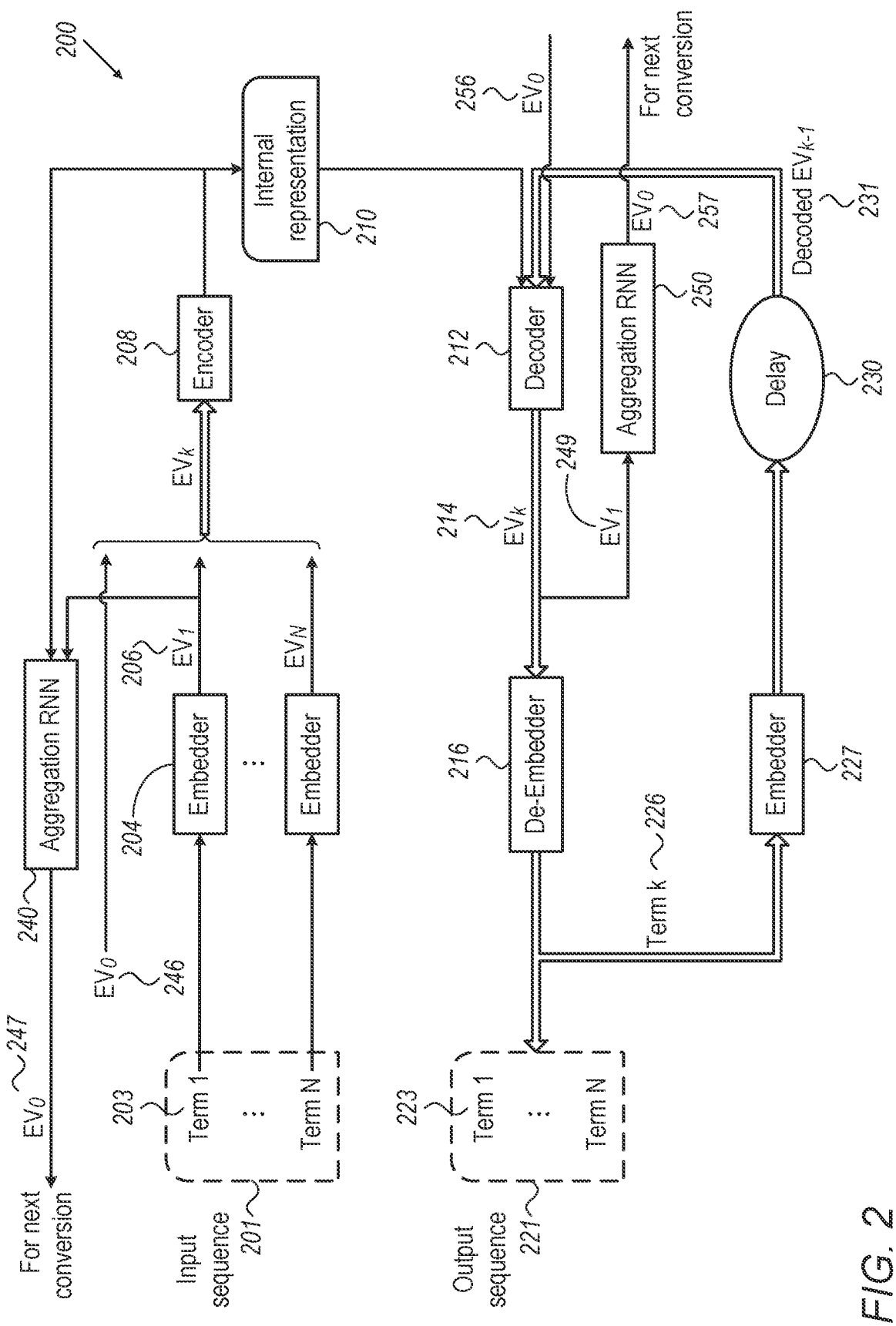
FIG. 2 is a block diagram schematically describing a sequence-to-sequence conversion model employing a recursive neural network (RNN) model, in accordance with an embodiment of the present invention.
Figure 3:
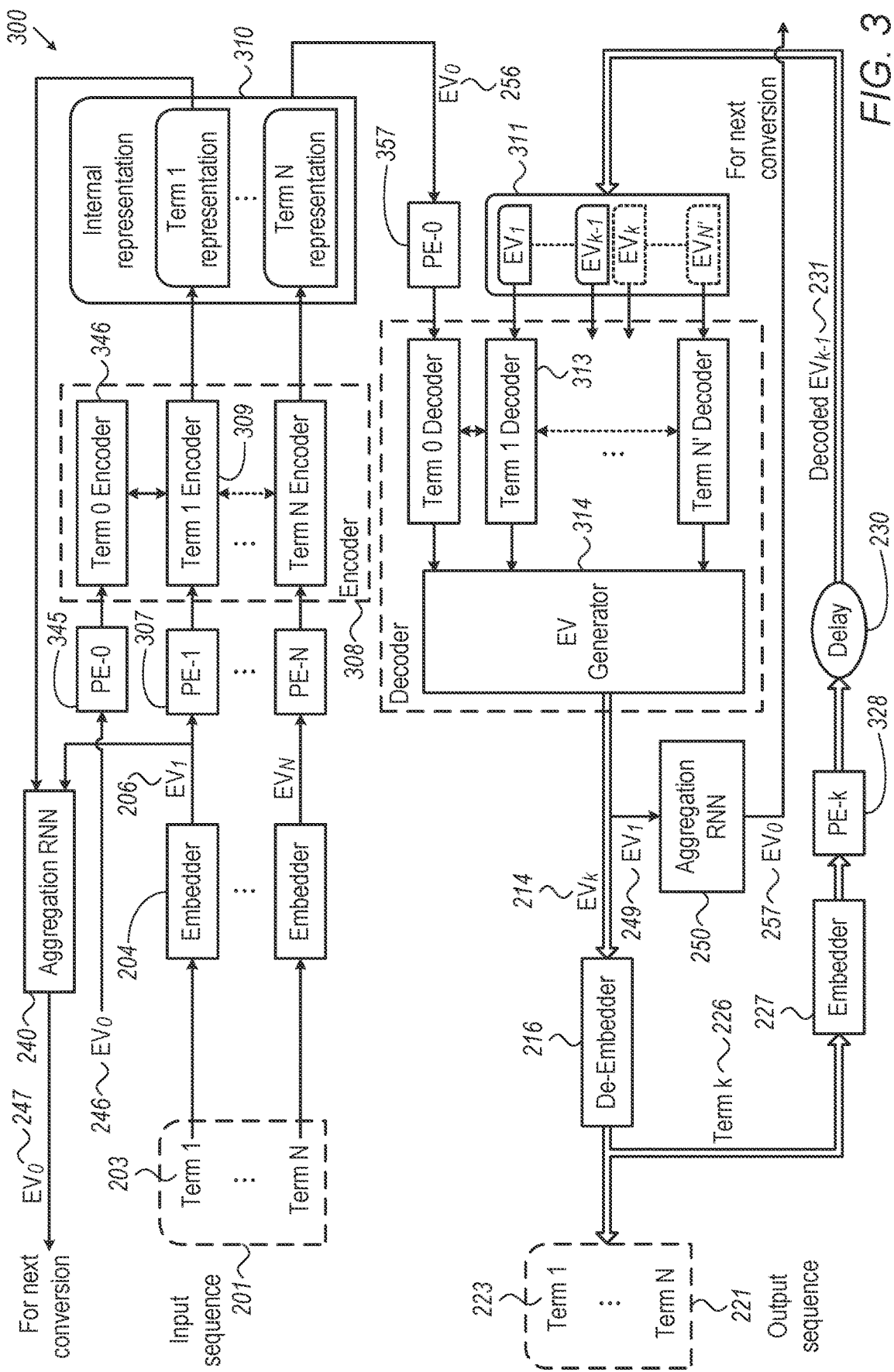
FIG. 3 is a block diagram schematically describing a sequence-to-sequence conversion model employing a Transformer model, in accordance with an embodiment of the present invention.

FIGS. 2 and 3 are block diagrams which schematically describe two exemplary embodiments, 200 and 300, respectively, among other possible embodiments, representing two main approaches for performing the conversion. While these two embodiments are different, they share a concept and some functionally equivalent components. In the description of FIG. 2, the disclosure points out such common components, and for clarity they are marked with the same numerical identifiers in both figures (although details of implementation may be different in different embodiments).

Figure 4:
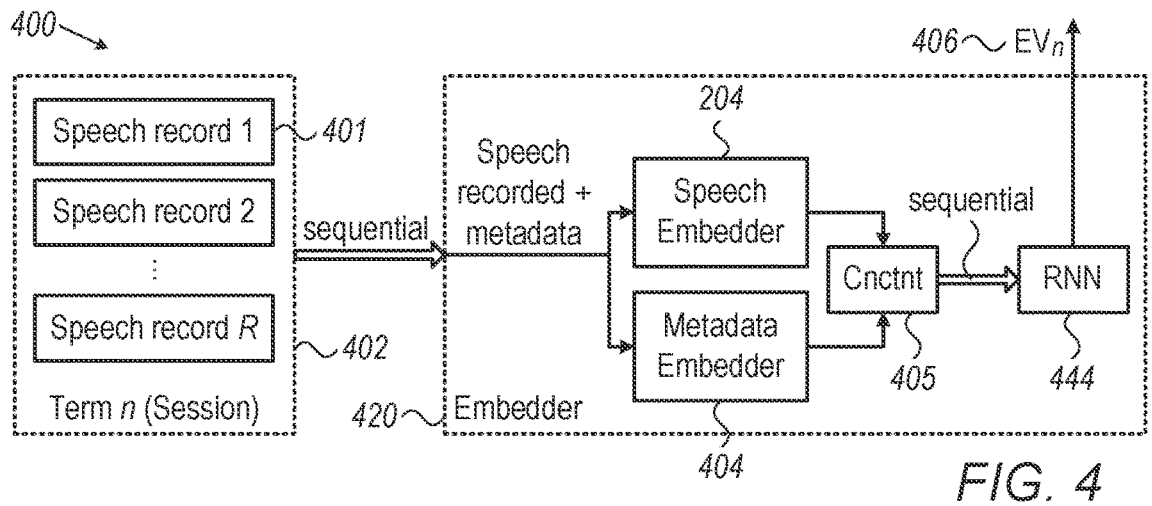
FIG. 4 is a block diagram schematically describing a session-embedding model for the sequence-to-sequence conversion models of FIGS. 2 and 3, in accordance with an embodiment of the present invention.

Notation notes: In FIGS. 2, 3 and 4, rectangles indicate components which execute specific tasks. Rectangles with rounded upper corners designate memory allocated for collections of data, such as sequences of terms or of vectors. Double-line arrows indicate sequential transfer of data, that is, in an iterative processing, transferring of a subsequent data unit in each iteration, while single-line arrows indicate data transfer which happens once during the conversion computation.

The first stage of processing is common to both embodiments. At the input is a sequence 201 of N terms. Each term 203 (e.g., speech record, or a session of speech records) of the input sequence 201 is converted by an embedder 204 into an embedding vector (EV) 206 of a fixed dimension. This operation is contextless, that is, the embedding vector 206 of a term is independent of the other terms of the input sequence. Consequently, the embedding operation can be done in parallel on all terms N input terms. It is shown in FIG. 2 and as being done in parallel, although in some embodiments the embedding may be done in other ways.

FIG. 2 depicts an approach based on using RNNs in the encoder 208 and decoder 212. The EVs 206 are fed sequentially into encoder 208 by Serializer 207. As the input is presented to the DNN sequentially, the neuron memory represents the state of the system at each iteration.

The processing by encoder 208 yields an internal representation 210, typically a sequence of vectors of a high dimension. It is assumed that the internal representation 210 contains all of the information which is needed to decode the output sequence 221. The internal representation 210 may be derived from the output of the RNN in the encoder, as well as from its internal memory, at the end of each iteration.

A decoder 212 is also based on a RNN. Decoder 212 generates the decoded embedding vectors 214 sequentially, which are then converted into output terms 223 (e.g., indicators) by the de-embedder 216. The output sequence 221 consists of all the output terms 223. Note that the embedding vectors on the decoder and encoder sides may be in different vector spaces.

The decoder operation is iterative. In each iteration, one term of the output sequence is generated. The input to the decoder in the k-th iteration is the internal representation 210 computed by the encoder, and an embedding vector 231 which represents the output term computed in the previous, (k−1)-th iteration. $EV_{k-1}$, the embedding vector 231, is generated by a feedback loop, where in iteration k, the output 226 of De-Embedder 216 is embedded by Embedder 227 and delayed by Delay 230 to yield Decoded $EV_{k-1}$ 231. Note that Delay 230 is not an actual processing component; it indicates the delay which occurs naturally in the feedback loop as a consequence of the system being causal. A special symbol is used for Decoded $EV_{k-1}$ on the first iteration to indicate that no previous iteration exists. Another special symbol is used for the decoder output to indicate the end of the output sequence. Note that De-Embedder 214 and the feedback loop exist also in FIG. 3 architecture.

FIG. 2 is brought by way of example, where additional or different components of the model may be included in other embodiments. For example, for clarity of presentation, in the shown sequence-to-sequence model of FIG. 2 the only temporal information about the input is the sequential order of the terms of the output sequence. Typically, however, the actual time for each term is also included with each term as metadata, as will be described below in more detail.

This disclosure denotes input terms preceding the last D sessions "far history", and represent them by a single embedding vector $EV_0$ 246, which is a representation of the far history. $EV_0$ is fed into the encoder as "term 0" which precedes all other terms. Initially, $EV_0$ gets a value which indicates "no far history" (e.g., $EV_0$ is all zeroes). In each conversion, aggregation RNN 240 computes an updated $EV_0$ (247) which is stored for use as $EV_0$ 246 in the next conversion operation. This way the size of the input is kept fixed regardless of the number of inputs accumulated during a more remote past, while still using information from the far history. Aggregation RNN 240 typically contains a RNN, the adaptive weights of which learn the characteristics of the far history. FIG. 2 depicts two alternative ways to generate the input to Aggregation RNN 240. In one embodiment, the input is $EV_1$, the embedding vector 206 representing Term 1, which is the oldest term in the input sequence. In the second embodiment, the input to Aggregation RNN 240 is derived from the output of the encoder, for example, the input to Aggregation RNN 240 may be a subset of the Internal Representation 210.

It should be noted that $EV_0$, the aggregated far history 246, 247, need not be identical in dimension and format to the other embedded vectors 206, and the way in which the encoder processes $EV_0$ may be different from the way it processes the other embedding vectors.

The number of decoder output terms, which are necessary for diagnostics, may be considerably smaller than the number of output terms which would be normally generated in response to the input sequence of N terms. Given the structural similarity between the encoder and the decoder, some embodiments represent the far history of Decoded $EV_{k-1}$ 231 by a single embedding vector $EV_0$ 256 which is fed into decoder 212, which allows generating a smaller number N' of decoder terms. In each conversion, an updated version of $EV_0$ (257) is computed by aggregation RNN 250 and stored for use as $EV_0$ 256 in the next conversion. As in the case of the first embodiment of the Aggregation RNN 240 in the encoder, the input to decoder Aggregation RNN 250 is $EV_1$ 249, the EV of Term 1, which is output 214 of decoder 212, in the first iteration.

Another approach to the disclosed ML-based technique uses a Transformer architecture (FIG. 3), which is explained in more detail below, to capture the interrelations among the terms of the sequence. In the Transformer architecture, embedding vectors $EV_1, \ldots, EV_n$ (206) are presented to the encoder 308 in parallel, as opposed to the sequential encoding in the RNN-based approach.

In sequential processing architectures such as that of FIG. 2, the sequential order of the terms of the input sequence is conveyed to the encoder by the order in which the embedding vectors are fed to the encoder. In the architecture of FIG. 3, the embedding vectors 204 are fed to the encoder in parallel (at least conceptually) and processed in parallel, hence it is necessary to provide the encoder with the sequential order explicitly. To this end, a Transformer model includes position encoding: each of the input embedding vectors is modified to indicate its position in the sequence. Typically, this is done by position encoding (PE) units 307, PE-1, . . . . PE-N that add a positioning vector (not shown) to each respective embedding vector, based on embedding vector place in the sequence (first, second, etc.). The positioning vector may be, for example, samples of a sine wave, the frequency of which is determined by the position of the corresponding term in the input sequence.

In some embodiments, the position encoding may indicate the position of the input term in the absolute timeline, rather than its sequential position in the input sequence. For example, if a session is supposed take place every day, the position of each term may be set based on the day during which it occurred, rather than on its position in the sequence. Thus, all speech records belonging to the same session have the same positional encoding, and on the other hand, if the patient fails to record several sessions, this too is reflected in the positional encoding. In FIG. 3 this is done by the positional encoders 307. For example, PE-n adds to EV-n a sine wave of frequency w*n where w is some fixed frequency. The different sine waves signal to the NN that the temporal order of the terms. Suppose for example that the input sequence comprises 5 terms recorded on days 1, 2, 4, 5, 5 (skipped day 3 and recorded twice on day 5). In the disclosed implementation of the sequence-to-sequence approach the processor position-encodes these terms with sine waves of frequencies w*1, w*2, w*4, w*5, w*5, to indicate that term 3 is missing and the last two terms occurred on day 5.

The sequence of position-encoded embedding vectors is processed by a set of respective encoder units 309 of an encoder 308 to yield an internal representation 310, typically a sequence of vectors of a high dimension. The operation of each encoder unit 309 is affected by the operation of the other encoder units, because of the use of an attention model, as will be described in greater detail below. Consequently, encoder units 309 execute their computations jointly and therefore the operation of the encoder 308 is inherently parallel (unlike the sequential encoder 208 in FIG. 2). It is assumed that the internal representation 310 contains all of the information which is needed to decode output sequence 331. Some embodiments also include an Aggregation RNN 240, similar to Aggregation RNN 240, in FIG. 2, in order to aggregate the far history and represent it by a single EV 247, which is stored for the next conversion and fed back into the encoder as $EV_0$ (246). A position encoder PE-0 (345) adds position information to $EV_0$ (246) and then it is fed to a separate encoder unit 346, Term 0 Encoder, which is processed jointly with the other encoder units 309 in the encoder 308.

A decoder 312 generates the decoded embedding vectors 214, which are then processed in a way similar to that of FIG. 2. The operation of the decoder is iterative, and in iteration another output term is generated. $EV_k$, the output 214 of the decoder at iteration k, is de-embedded by De-Embedder 216 and added to the output terms 221. A feedback loop, similar to the feedback loop in FIG. 2, exists, with the notable addition of position encoder PE-k (328), which applies position encoding to the output of the Embedder 227. Some embodiments also include far history aggregation in the decoder. An embedding vector $EV_0$ (256) is position encoded by position encoder PE-0 (357) and fed into decoder 312 as an aggregated representation of the far history. A decoder Aggregation RNN 250, which, as in the case of FIG. 2, receives as input $EV_1$, the output 214 of the decoder in the first iteration, produces an embedding vector $EV_0$ 257, which represents of the far history and is stored for use as $EV_0$ 256 in the next conversion computation.

While the overall architecture is similar to that of FIG. 2, internally, the structure of decoder 312 is quite different from that of its counterpart 212 in FIG. 2 and bears similarity to the structure of encoder 308. The input to decoder 308 comprises of the Internal representation 310; embedding vectors 311 corresponding to the N' output terms, where terms which were not decoded yet are masked and replaced by a special input indicating "no data"; and, if present, the far history representation $EV_0$ (256) after position encoding by PE-0.

Inside the decoder, each of the N' embedding vectors 311 in the input is processed by a separate decoder unit 313. The operation of each decoder unit 313 is affected by the operations of all other decoder units, because of the use of an attention model, hence in each iteration, decoder units 313 execute their computations jointly and therefore, the operation of decoder 312 is inherently parallel.

The Transformer model 300 further includes Attention models inside encoder 306 and decoder 312. Attention is a method to compute, for each term in the sequence, the respective relevance of other terms in the sequence. The Attention algorithm introduces a novel element into the DNN concept. Conventionally, each layer of a DNN performs a linear operation on an input vector, which is followed by a non-linear operation (activation function) to produce each term of the output. In addition to these elements, the attention algorithm also involves inner products (also known as dot products) of two vectors of output of the same layer, each derived from a different term in the sequence, and using the results to modify the output.

In practice, the system may use one embedder to sequentially process all the terms in the sequence. If the term is a session of several speech segments and the embedder contains an RNN to which the speech segments are fed sequentially, then the RNN in FIGS. 2 and 3 must be reset before processing each term in order to make the embedders truly independent of each other. The subject of session embedding is discussed in detail below.

Finally, concerning any sequence-to-sequence technique in use, the interpretation of a sequence of sessions recorded in a first given time step, such as one day apart, is very different from the interpretation of sequence of sessions recorded at another, longer second time step, such as two days apart. Moreover, the disclosed techniques can address the problem of missing sessions, due to less-than-perfect compliance. The patient may, for whatever reason, not make any recordings for several days. Therefore, the time interval between two consecutive sessions is not constant. In one embodiment, the processor includes absolute temporal information in the input to the system by incorporating the time of recording, or equivalently, the time since the previous recording, in the metadata which is added to the embedding vector of each term in the sequence. In another embodiment, the processor uses the positional encoding for this purpose. For example, by adding a sine wave of frequency $t[k]*w$ to the $k^{th}$ embedding vector, where $t[k]$ is the day number of the $k^{th}$ session.

This flexibility allows optimizing the technique to a relevant time scale upon which changes (e.g., a deterioration) is detectable, thereby saving monitoring efforts and computation power.

Both models 200 and 300 above provide ways to aggregate the far history into a fixed size vector 247, which, in the next conversion is added to the input to the system "term 0" 246, thus limiting the size of the input to the system.

Sequences of Sessions of Speech Records

As noted in the overview, training and inference from sequences of speech sessions may be more computationally economical than using sequences of individual speech records.

There are several approaches to performing session embedding. According to one approach, the speech records in the session are concatenated, possibly spaced by intervals of silence or of specific sounds (e.g., white noise), and the result is treated as a single speech record. It is embedded in a fixed size vector space as described above and concatenated with the session metadata, which is also a vector of fixed size. However, adequately representing the concatenated speech record by an embedded fixed-size vector may require the fixed-size vector to be of a much higher dimension, and may make the speech embedder considerably more complex.

An alternative embedder is shown in FIG. 4, a block diagram schematically describing a session embedding model 400 for the sequence-to-sequence conversion models of FIGS. 2 and 3, in accordance with an embodiment of the present invention.

In FIG. 4, each individual speech record 401 of a session 402, along with the individual speech record metadata, is converted (204, 404, 405) into a vector of a fixed size as described above (not shown). These vectors are then sequentially fed into a dedicated RNN 444, and the output 406 on the dedicated RNN for the last input vector is the embedded vector which is fed into the encoder (such as vectors 206 and 306 in respective FIGS. 2 and 3). This operation is repeated for each of the input sessions.

The advantage of using a whole session as a term in the sequence is that the input sequence has much fewer terms, making computation much more manageable. This, however, comes at some initial cost of having to train RNN 444 as a part of the sequence-to-sequence conversion model training.

Some of the metadata may be common to all terms in the sequence, e.g., general patient information (date of birth, gender, etc.), or, if the terms are defined as individual speech records, common metadata may be information that is related to the session as a whole. Such common metadata may be duplicated and embedded with each term. Alternatively, the model can define an additional separate "preamble" term in the sequence, which includes the common metadata but no speech records.

A session has its own metadata, which is generally the elements of the metadata of the speech records which are identical in all speech records in the session. In particular, each session is associated with a particular time point, where time is specified at a resolution which is commensurate with time scale of the disease, for example, at a resolution of days.

The order of the records in the session may be arbitrary, but some embodiments may impose ordering rules. For example, the speech records may be ordered according to the recording start time, where records with the same start time are ordered in decreasing order of recording duration. Alternatively, the speech records in a session may be ordered based on their verbal content, for example, the speech records may be ordered in a lexicographic (dictionary) order, where the previous ordering, which is based on start time and duration, is applied to speech records with the same verbal content.

Figure 5:
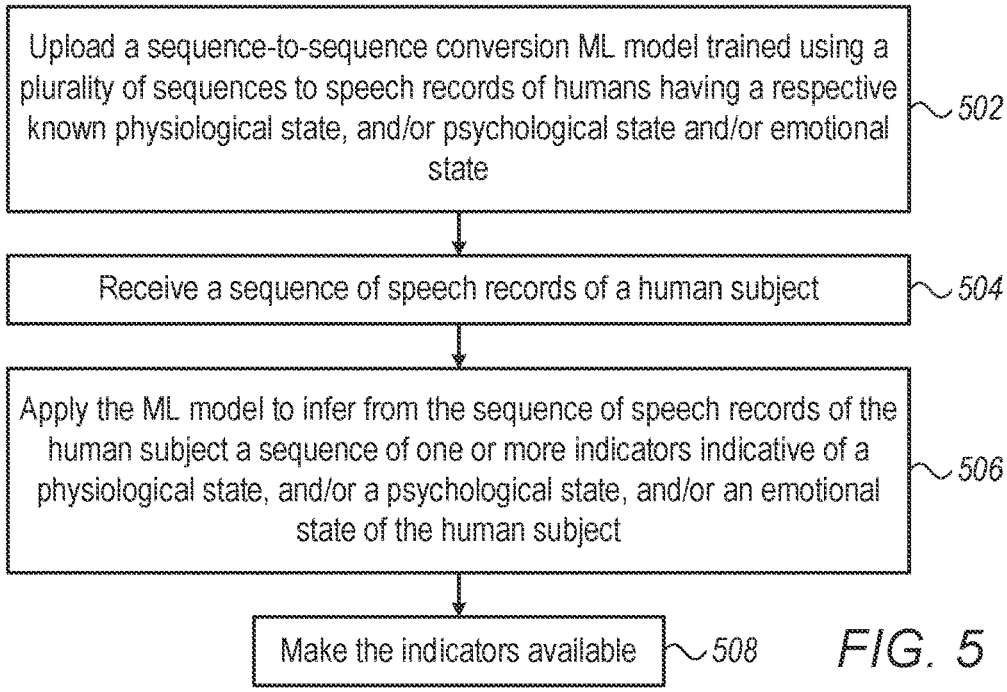
FIG. 5 is a flow chart schematically describing a method to infer, from a sequence of speech records and using a sequence-to-sequence conversion ML model, at least one of the following: a physiological and/or psychological and/or emotional state of a human subject, in accordance with some embodiments of the present invention.

Inferencing Indicators From Sequences of Speech Records Using a Trained Sequence-to-Sequence Conversion ML Model FIG. 5 is a flow chart schematically describing a method, using a sequence-to-sequence conversion ML model, to infer from a sequence of speech records a physiological and/or psychological and/or emotional state of a human subject, in accordance with some embodiments of the present invention. The algorithm, according to the presented embodiment, carries out a process that begins with a model uploading step 502, in which processor 28 uploads a sequence-to-sequence ML model, such as models 200 or 300 (depicted in FIG. 1 as the trained ML model 46), that is trained using a plurality of sequences of human speech records, each having at least one of a respective known physiological state, psychological state or emotional state.

During use, processor 28 receives a sequence of speech records of a human subject, such as recorded by device 32, at speech records receiving step 504.

Next, processor 28 applies the ML model to infer, from the sequence of speech records of the human subject, and corresponding metadata, a sequence of one or more indicators indicative of at least one of the following: a physiological state, a psychological state, or an emotional state of the human subject, at an inferencing step 506. This step involves one of models 200 and 300 applying the steps described in FIGS. 2 and 4 or 3 and 4 (for input sessions).

Finally, processor 28 makes the output sequence of indicators available. The processor is configured to make the indicators available by at least one of the following: sending the indicators over a network to a user's device; providing an interface that allows the user to access them; sending an alert message when the output sequence of indicators fits a certain pattern; or presenting the indicators graphically, as seen for example in FIGS. 7 and 8.

The disclosed models are trained on a large number of human subjects, for which the "ground truth" clinical indicator is determined by a different method, e.g., by a hands-on medical examination or a lab test. Training adapts the parameters of all layers of the encoder and the decoder so that the ML model output becomes closer to the ground truth. The method described hereinafter is for Transformer model 300, but is modified due to the fact that the "ground truth" is not always given, or is not precise, as explained below.

In case of a medical application, some components of the clinical indicator may be lab test results, which are available only on the specific days when the lab tests are taken. For days in which those components are missing, adaptation is based only on the available components.

The "synthetic" component of the clinical indicators, which represents the status of the patient, is seldom available explicitly. An actual value of this parameter is available when an event happens, such as hospitalization, where it can be said that clinical indicator must be 1 (UNSTABLE) on that day and perhaps on a few of the preceding days. Usually, either a range is given, or general rules on the behavior of the patient status over time. For example:

The day-to-day difference in patient status is between −0.05 (decrease) and 0.2 (increase).

If 30 days have passed since a specific date without any medical intervention, then the status of the patient on that specific date is ≤0.25

If a physician sees the patient and increases the dose of medication, the status of the patient is between 0.4 to 0.7. If the physician reduces the dosage, the state of the patient is ≤0.05. If nothing changes, the patient's status is ≤0.15.

The status of the patient is between a minimum and a maximum determined by the given chemical level in blood when the level is measured.

The parameter corrections during training are driven by the computed error, which is the difference between the value computed by the network and the ground truth. Since the actual ground truth is not known, and instead is only within a possible range in which it may exist, the error is set to zero if the value is within the range and set to the distance to the range boundary if it is out of the range.

Figure 6:
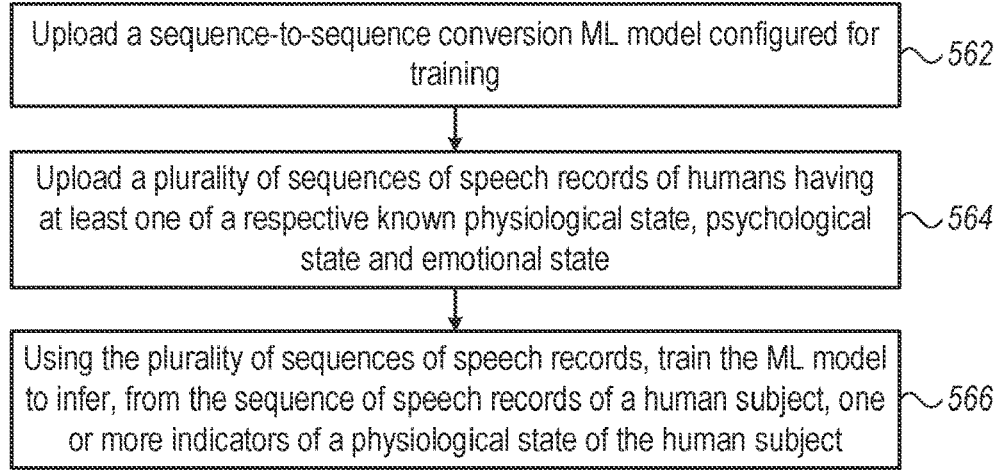
FIG. 6 is a flow chart schematically describing a method to train the sequence-to-sequence conversion ML model of FIG. 5, using a plurality of speech records of human subjects each having at least one of the following: a physiological and/or psychological and/or emotional state, in accordance with some embodiments of the present invention.

FIG. 6 is a flow chart schematically describing a method to train the sequence-to-sequence conversion ML model of FIG. 5 using a plurality of speech records of human subjects, each having a known physiological and/or psychological and/or emotional state, along with possible corresponding metadata, in accordance with some embodiments of the present invention. The algorithm, according to the presented embodiment, carries out a process that begins with a model uploading step 562, in which processor 60 uploads an untrained sequence-to-sequence ML model, such as models 200 or 300.

Next, processor 60 uploads a plurality of labeled sequences of human speech records each having at least one of a respective known labeled physiological state, psychological state or emotional state, at labeled speech records uploading step 564. The labels may include speech labeled as NORMAL, STABLE, etc. for control purposes.

At ML model training step 566, processor 60 uses the uploaded plurality of labeled speech records (e.g., database 44 of FIG. 1) to train one of models 200 and 300 (depicted in FIG. 1 as the untrained ML model 44) to infer, from a sequence of speech records of a human subject, a sequence of indicators of at least one of the following: a physiological state, a psychological state, or an emotional state of the human subject.

The flow charts of FIGS. 5 and 6 are simplified for clarity of presentation. In practice they may include additional steps, such as the aforementioned aggregation. Details behind some required steps, including embedding steps, are omitted for simplicity.

Sequence Output of Indicators of a State of the Subject

Figure 7:
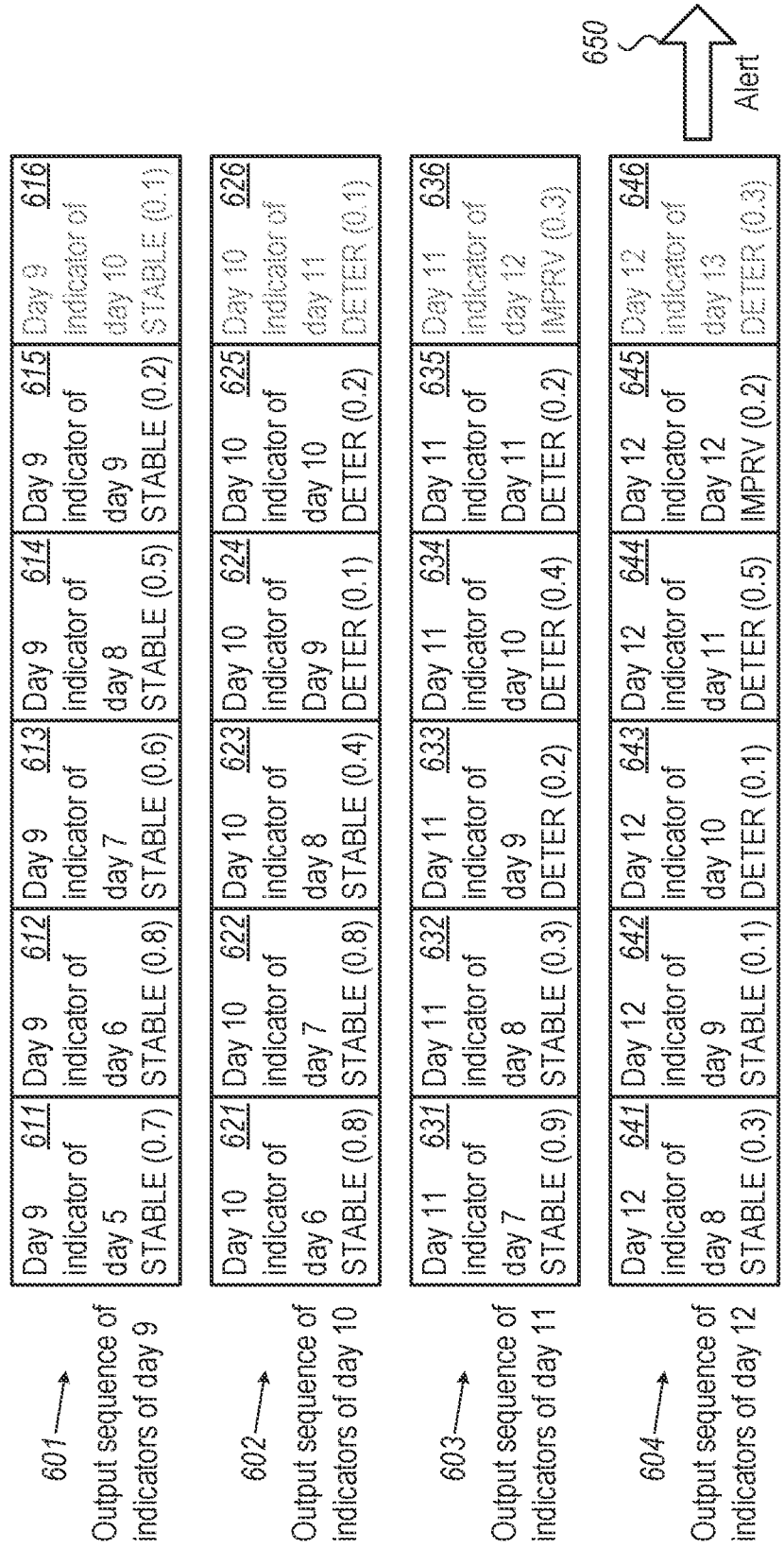
FIG. 7 is a plot of daily output sequences of moving 6-day respective indicators, each comprising at least one clinical indicator, in accordance with an embodiment of the present invention.

FIG. 7 is a plot of daily output sequences (601, 602, 603, 604) of moving 6-day respective indicators (611-616, 621-626, 631-636, 641-646) each comprising at least one clinical indicator, in accordance with an embodiment of the present invention.

FIG. 7 provides a schematic depiction of the output indicator sequences applicable to four days (days 9-12). For simplicity, this depiction assumes that the output sequence for each day contains only six indicators (611-616, 621-626, 631-636, 641-646). On each day, the output indicator sequence contains an indicator for the current day, for the four previous days, and a prediction of the indicator for the next day (on the right, in gray letters). Note that several output sequences may contain an indicator for the same day; for example, all four displayed sequences include indicators of day 8 and day 9. These indicators need not be identical. For example, the day 10 indicator of day 9 may be different from day 11 indicator for the same day 9.

As seen in FIG. 7, one exemplified clinical indicator is a patient's condition selected among the three labels of STABLE, IMPROVING, and DETERIORATING. The number in parenthesis next to the patient's condition is a level of confidence at the clinical indicator of patient condition, the level of confidence, or "reliability," ranging between 0 and 1.

As further seen in FIG. 7, the processor issues an alert 650 based on a cumulative reliability of the DETERIORATING label. The system may take action based on the output sequence indicator on a given day.

The decision to take an action may be based on the output sequence of a particular day. Referring to the exemplary indicator components in Table 1, examples of decision rules for taking an action may be:

The cumulative reliability estimates of a patient's state being DETERIORATING, over four consecutive days, exceeds 0.8 (if the label is not DETERIORATING, the reliability estimate is taken to be zero for the purposes of this calculation). This is depicted in FIG. 7, which shows, for each indicator, the patient's state and the reliability estimate for the state (in parenthesis). Note that the alert is issued on day 12, despite an apparent transient improvement on that day, because of a predicted deterioration on the following day.

Another possible component in the indicator (not shown here, though appearing in Table 1) is an estimate of the day when hospitalization will be needed. An alert may be issued, for example, when that day is no more than ten days away.

Yet another possible component in the indicator (also not shown, though appearing in Table 1, and plotted in FIG. 8 below) is an estimated level of a certain chemical in blood. An alert may be issued, for example, when that level is above a given threshold value for four consecutive days and increasing over these days.

As seen in FIG. 7, the disclosed techniques give estimates of the patient's condition over several days (a history). The disclosed technique may have that history updated based on later observations, e.g., have the history continuously updated. For example, suppose that on day n the clinical indicator for day n (the current day) is A. On day n+k, according to the invention, the clinical indicator for day n might be updated to B, reflecting new information obtained in days n+1, . . . , n+k. This is shown, for example, in FIG. 7 by the label 615 of day 9 in sequence 601 being STABLE, but in some of the subsequent sequences (e.g., sequence 602) the label (624) of day 9 changed to DETERIORATING, reflecting information from day 10. As further seen, the reliability of the label of day 9 as DETERIORATING increases in sequence 603 (label 633) based on new information from day 11.

One possible action on the output sequence of indicators may be sending an alert 650 message to the patient, the patient's medical provider, or any other entity (person or organization) designated to receive such alerts. Another possible action may be issuing an order for additional tests for the patient. Yet another possible action may be causing a change in the patient's medications, e.g., by sending an electronic message to a medication metering device.

Figure 8:
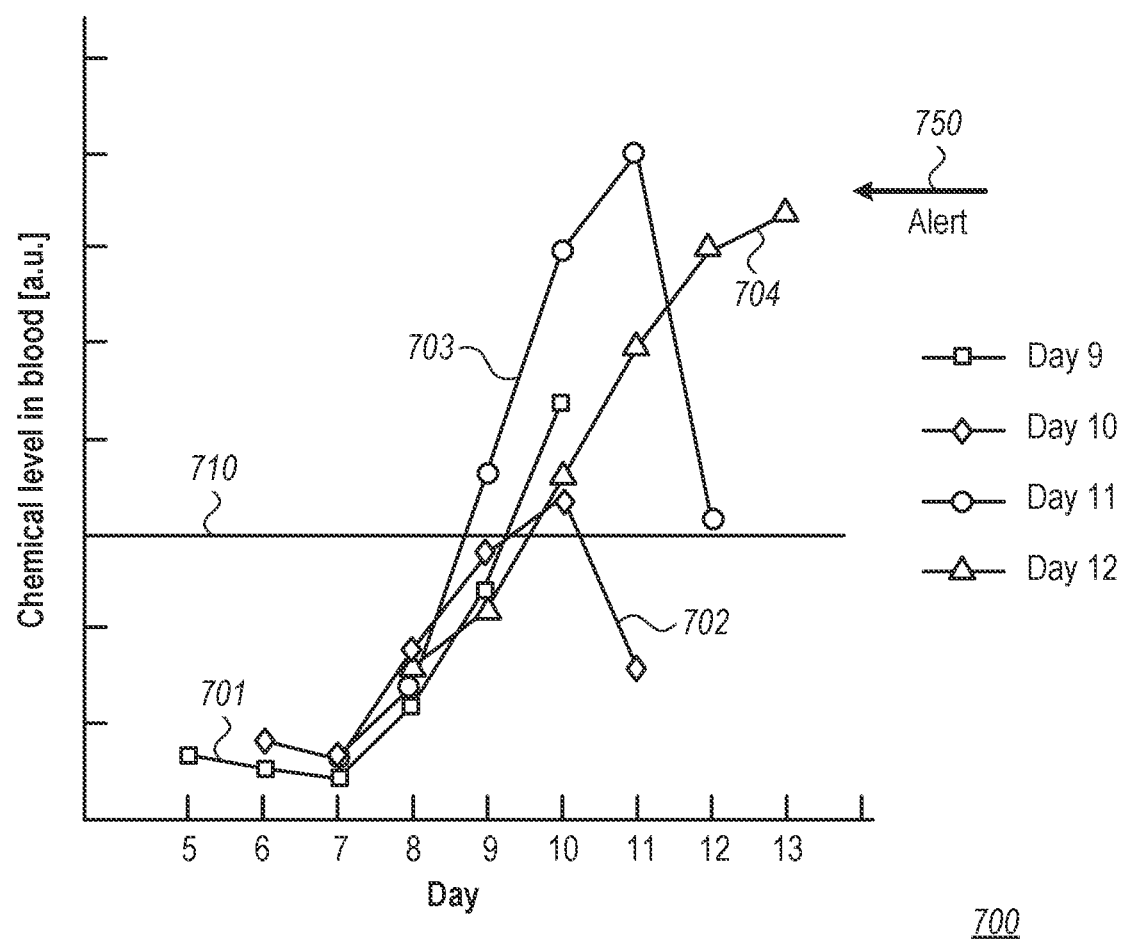
FIG. 8 is a graphical representation of the output sequences of a chemical level in blood indicators of FIG. 7, in accordance with an embodiment of the present invention.

FIG. 8 is a graphical representation (701, 702, 703, 704) of the output sequences of estimates of the chemical level in blood indicators of FIG. 7, in accordance with an embodiment of the present invention. The condition for issuing an alert is satisfied on day 12, and only on that day, because Graph 704 of FIG. 8 shows an estimated level of the chemical in the blood is above threshold 710 and increasing for four consecutive days. In such a case a condition for issuing an alert 750 is satisfied only on day 12.

It will be appreciated by persons skilled in the art that the present invention is not limited to what has been particularly shown and described hereinabove. Rather, the scope of embodiments of the present includes invention both combinations and subcombinations of the various features described hereinabove, as well as variations and modifications thereof that are not in the prior art, which would occur to persons skilled in the art upon reading the foregoing description.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for evaluating at least one state selected from the group consisting of: a physiological state, a psychological state, and an emotional state, the system comprising:
a memory configured to store a machine learning (ML) model trained using a plurality of training sequences of speech records, each of the speech records having been produced by a respective human while the state of the human was known; and
a processor, which is configured to:
receive a time sequence of speech records of a human subject;
apply the trained ML model to the time sequence of speech records so as to convert the time sequence of speech records, via a sequence-to-sequence conversion, to a sequence of indicators indicative of the state of the human subject at different respective time points in a time period; and
output the sequence of indicators.

2. The system according to claim 1, wherein the time sequence of speech records is a sequence of speech utterances associated with respective recording times, and wherein the recording times are also inputs to the trained ML model.

3. The system according to claim 1, wherein the processor is configured to apply the ML model by representing the time sequence of speech records by a sequence of embedding vectors and applying the model to the embedding vectors.

4. The system according to claim 3, wherein each embedding vector represents a respective subset of the speech records, independently of other embedding vectors.

5. The system according to claim 3, wherein the processor is further configured to aggregate a portion of the embedding vectors into a single aggregated embedding vector and to apply the model to a set of the embedding vectors comprising the aggregated embedding vector.

6. The system according to claim 1, wherein at least some of the indicators comprise at least one element selected from the group consisting of; a label selected from a set of labels associated with a predefined set of states, and an estimated level of confidence in the indication.

7. The system according to claim 1, wherein the processor is configured to output the sequence of indicators by at least one action selected from the group consisting of: sending the indicators over a network to a user's device, providing an interface that allows the user to access them, sending an alert message when the output sequence of indicators fits a certain pattern, and presenting the indicators graphically.

8. The system according to claim 1, wherein the known state is with respect to a medical condition and wherein the indicators are clinical indicators.

9. The system according to claim 8, wherein the medical condition is selected from a list of medical conditions consisting of: cardio-vascular disease, pulmonary disease, respiratory disease, neurological disease, psychological disease, congestive heart failure, coronary heart disease, heart arrhythmia, chronic obstructive pulmonary disease (COPD), interstitial lung disease, asthma, Hypocarbia, Hypercarbia, altitude sickness, Parkinson disease, Alzheimer disease, bipolar disorder mild cognitive impairment and depression.

10. The system according to claim 8, wherein the clinical indicators are indicative of a presence of excess fluid in the chest.

11. The system according to claim 1, wherein the indicators provide an estimate of time left until the state reaches a certain stage.

12. The system according to claim 1, where one or more of the indicators comprise estimates of measurable parameters of the human subject that are indicative of the state of the human subject.

13. The system according to claim 1, wherein one or more of the indicators indicate whether the human subject is stable or unstable with respect to the state.

14. The system according to claim 1, wherein the trained ML model comprises a trained neural network (NN) model.

15. The system according to claim 14, wherein the trained NN model comprises a Transformer model comprising an Attention model.

16. The system according to claim 14, wherein the trained NN model comprises a recursive neural network (RNN) model that adjusts the weights of the RNN during inference.

17. The system according to claim 1, wherein the processor is configured to apply the trained ML model to the time sequence of the speech records by grouping the sequence of the speech records into a sequence of sessions of the speech records and applying the ML model to the sequence of sessions of the speech records.

18. A system for evaluating at least one state selected from the group consisting of: a physiological state, a psychological state, and an emotional state, the system comprising:
a memory configured to store a machine learning (ML) model; and
a processor, which is configured to:
receive a plurality of training sequences of speech records, each of the speech records having been produced by a respective human while the state of the human was known; and
using the plurality of training sequences of speech records, train the ML model to convert a time sequence of speech records of a human subject, via a sequence-to-sequence conversion, to a sequence of indicators indicative of the state of the human subject at different respective time points in a time period.

19. A method for evaluating at least one state selected from the group consisting of: a physiological state, a psychological state, and an emotional state, the method comprising:

storing a machine learning (ML) model trained using a plurality of training sequences of speech records, each of the speech records having been produced by a respective human while the state of the human was known;

receiving a time sequence of speech records of a human subject;

applying the trained ML model to the time sequence of speech records so as to convert the time sequence of speech records, via a sequence-to-sequence conversion, to a sequence of indicators indicative of the state of the human subject at different respective time points in a time period; and outputting the sequence of indicators.

20. The method according to claim 19, wherein the time sequence of speech records is a sequence of speech utterances associated with respective recording times, and wherein the recording times are also inputs to the trained ML model.

21. The method according to claim 19, wherein applying the ML model comprises representing the time sequence of speech records by a sequence of embedding vectors and applying the model to the embedding vectors.

22. The method according to claim 21, wherein each embedding vector represents a respective subset of the speech records, independently of other embedding vectors.

23. The method according to claim 21, and comprising aggregating a portion of the embedding vectors into a single aggregated embedding vector and applying the model to a set of the embedding vectors comprising the aggregated embedding vector.

24. The method according to claim 19, wherein at least some of the indicators comprise at least one element selected from the group consisting of; a label selected from a set of labels associated with a predefined set of states, and an estimated level of confidence in the indication.

25. The method according to claim 19, wherein outputting the sequence of indicators comprises at least one action selected from the group consisting of: sending the indicators over a network to a user's device, providing an interface that allows the user to access them, sending an alert message when the output sequence of indicators fits a certain pattern, and presenting the indicators graphically.

26. The method according to claim 19, wherein the known state is with respect to a medical condition and wherein the indicators are clinical indicators.

27. The method according to claim 26, wherein the medical condition is selected from a list of medical conditions consisting of: cardio-vascular disease, pulmonary disease, respiratory disease, neurological disease, psychological disease, congestive heart failure, coronary heart disease, heart arrhythmia, chronic obstructive pulmonary disease (COPD), interstitial lung disease, asthma, Hypocarbia, Hypercarbia, altitude sickness, Parkinson disease, Alzheimer disease, bipolar disorder mild cognitive impairment and depression.

28. The method according to claim 26, wherein the clinical indicators are indicative of a presence of excess fluid in the chest.

29. The method according to claim 19, wherein the indicators provide an estimate of time left until the state reaches a certain stage.

30. The method according to claim 19, where one or more of the indicators comprise estimates of measurable parameters of the human subject that are indicative of the state of the human subject.

31. The method according to claim 19, wherein one or more of the indicators indicate whether the human subject is stable or unstable with respect to the state.

32. The method according to claim 19, wherein the trained ML model comprises a trained neural network (NN) model.

33. The method according to claim 32, wherein the trained NN model comprises a Transformer model comprising an Attention model.

34. The method according to claim 32, wherein the trained NN model comprises a recursive neural network (RNN) model that adjusts the weights of the RNN during inference.

35. The method according to claim 19, and comprising applying the trained ML model to the time sequence of the speech records by grouping the sequence of the speech records into a sequence of sessions of the speech records and applying the ML model to the sequence of sessions of the speech records.

36. A method for evaluating at least one state selected from the group consisting of: a physiological state, a psychological state, and an emotional state, the method comprising:

storing a machine learning (ML) model;

receiving a plurality of training sequences of speech records, each of the speech records having been produced by a respective human while the state of the human was; and using the plurality of training sequences of speech records, training the ML model to convert a time sequence of speech records of a human subject, via a sequence-to-sequence conversion, to a sequence of indicators indicative of the state of the human subject at different respective time points in a time period.

* * * * *